United States Patent [19]

Sato et al.

[11] 4,209,328
[45] * Jun. 24, 1980

[54] DYE IMAGE FORMING PROCESS

[75] Inventors: Yuzuru Sato; Ryuichiro Kobayashi, both of Hachioji; Naoshi Kunieda; Kazumasa Watanabe, both of Tokyo; Noboru Mizukura, Hachioji; Kenji Yoshida, Yokohama; Tadanori Oya, Kawasaki, all of Japan

[73] Assignees: Konishiroku Photo Industry Co., Ltd.; Mitsubishi Chemical Industries Limited, both of Tokyo, Japan

[*] Notice: The portion of the term of this patent subsequent to Jul. 4, 1995, has been disclaimed.

[21] Appl. No.: 808,867

[22] Filed: Jun. 22, 1977

[30] Foreign Application Priority Data

Jun. 29, 1976 [JP] Japan .................................. 51-77148

[51] Int. Cl.$^2$ .......................... G03C 5/54; G03C 1/40; G03C 9/00; G03C 1/10
[52] U.S. Cl. .................................. 430/225; 430/238; 430/376; 430/380; 430/393; 430/564; 430/566
[58] Field of Search ...................... 96/3, 29 D, 77, 99, 96/51

[56] References Cited

U.S. PATENT DOCUMENTS

| | | | |
|---|---|---|---|
| 3,134,762 | 5/1964 | Husek | 96/29 D |
| 3,186,982 | 6/1965 | Green et al. | 96/29 D |
| 3,241,963 | 3/1966 | Green et al. | 96/29 D |
| 3,307,947 | 3/1967 | Idelson et al. | 96/29 D |
| 3,930,864 | 1/1976 | Abel et al. | 96/29 D |

*Primary Examiner*—Richard L. Schilling
*Attorney, Agent, or Firm*—Bierman & Bierman

[57] ABSTRACT

In a dye image forming process in color photography comprising imagewise exposing a photographic element comprising a support and a light sensitive silver halide emulsion layer, and processing the exposed photographic element with an alkaline processing solution in the presence of a dye developer whereby a dye image corresponding to the imagewise exposure is formed by oxidation of said developer as a function of development of silver halide, the improvement which comprises the dye developer being a mono azo dye developer represented by the following formula:

$$X-N=N-Y-NH-Z$$

wherein X represents a monovalent group selected from an aromatic group, a non-aromatic-heterocyclic active-methylene-containing group, a non-aromatic-heterocyclic active-methyne-containing group, an aliphatic active-methylene-containing group, and an aliphatic active-methyne-containing group; and Y and Z respectively represent divalent and monovalent groups of an aromatic group, at least one of the X, Y and Z has therein at least one of the developer groups which are either capable of developing silver halide or changeable to a group capable of developing silver halide, the azo radical (—N=N—) and the secondary amino radical (—NH—) are respectively attached to the adjacent carbon atoms in Y, the azo radical being attached to an aromatic ring of the aromatic group of X or to the active methylene or methyne of X and is attached to an aromatic ring of the aromatic group of Y, and the amino radical is attached to aromatic rings of Y and Z.

20 Claims, No Drawings

DYE IMAGE FORMING PROCESS

The present invention relates to a process for forming a dye image in a light-sensitive silver halide color photographic material. Particularly, this invention is concerned with a dye image forming process using a dye developer. More particularly, it is concerned with a dye image forming process suitable for a color diffusion transfer utilizing a dye developer.

There have heretofore been known various dye image forming processes represented by such as a color development process using a dye resulting from a reaction of a color developing agent and a coupler or the so-called silver dye bleach process in which an azo dye is bleached in the presence of metallic silver.

Further, the so-called color diffusion transfer process is also known as a dye image forming process based on a technical idea different from those on which the above-mentioned two processes are based. This process includes such a process as disclosed in U.S. Pat. No. 2,647,049, in which a coupler used is rendered nondiffusible in a developed silver halide portion, such a process as disclosed in U.S. Pat. No. 3,087,817, in which a dye used is rendered non-diffusible at a developed portion, such a process as disclosed in U.S. Pat. No. 3,443,939, in which a compound capable of releasing a diffusible dye upon oxidation, or such a process as disclosed in U.S. Pat. No. 3,443,941, in which a linkage or cleavage reaction is carried out by utilizing unexposed silver halide, thereby to produce imagewise distribution of diffusible dyes. In addition to these, the so-called dye developer process is already well known, in which a light-sensitive element comprising a combination of a light-sensitive silver halide emulsion and a dye developer containing both a group capable of developing a silver halide and a dye moiety is imagewise exposed to light and, thereafter, the exposed element is subjected to an alkaline processing solution to develop the silver halide present in the exposed region, thereby rendering the dye developer present in the exposed region immovable, and the dye developer present in the unexposed region is imagewise diffusion-transferred to an image-receiving element superposed on the aforesaid light-sensitive element to obtain a dye image diffused thereto and formed therein. In this process, a positive image can be obtained by diffusion-transfer of the dye developer in the unexposed region to the image-receiving element. This dye developer diffusion transfer process has such advantages that the processing is simple and that the time required therefor is shorter in comparison with the before-mentioned color development process or silver dye bleach process.

As a dye developer is heretofore known a disazo type dye developer containing, in its molecule, two azo groups, an amino group and a group capable of developing silver halide, one of the two hydrogen atoms of the amino group being substituted by an aromatic group. This disazo type dye developer, however, has such defects that its spectral absorption region is too broad to reproduce colors well and that it causes the desensitization of silver halide. Further as another known dye developer, there is a monoazo type dye developer containing, in its molecule, only one azo group, a group capable of developing silver halide and an amino group or an amino group one of whose hydrogen atoms is substituted by an alkyl group. This monoazo type dye developer, however, has a problem in its preservation resulting from its poor stability against light and chemical attack.

The first object of this invention is to provide a process for forming an excellent dye image by utilizing a novel dye developer which can overcome the aforesaid defects. Another object of this invention is to obtain a dye image of high sensitivity and clear color tone within a relatively shorter processing time. Other objects of the invention will hereinafter be understood.

We have found that the above-mentioned objects can be accomplished by employing an image forming process comprising the following steps: a step of imagewise exposing a light-sensitive silver halide photographic element and then processing the said material with an alkaline processing solution in the presence of a monoazo type dye developer to form a dye image corresponding to imagewise exposure, which dye developer is represented by the following formula (I):

$$X-N=N-Y-NH-Z \qquad (I)$$

wherein X represents a monovalent group selected from an aromatic group, a non-aromatic-heterocyclic active-methylene-containing group, a non-aromatic-heterocyclic active-methyl-containing group, an aliphatic active-methylene-containing group, and an aliphatic active-methyne-containing group; and Y and Z respectively represent divalent and monovalent groups of an aromatic group, provided that at least one of X, Y and Z has therein at least one of the developer groups which are either capable of developing silver halide or changeable to a group capable of developing silver halide, the changeable group being hereinafter referred as a "precursor" of the group capable of developing silver halide, and further provided that the azo radical (—N=N—) and the secondary amino radical (—NH—) are respectively attached to the adjacent carbon atoms in Y.

The aromatic group as set forth above is a divalent or monovalent group derived from an aromatic hydrocarbon group such as a substituted or unsubstituted benzene or naphthalene group or an aromatic heterocyclic group such as a substituted or unsubstituted pyridine group, pyrimidine group, furan group or thiophene group. Among them, those which have the most preferable effect in this invention are a benzene group and a naphthalene group, both being unsubstituted or substituted.

Further, the aforesaid non-aromatic heterocyclic or aliphatic group containing active methylene or methyne includes a monovalent group derived from 3-phenylisooxazole-5-one groups, 2,4-dioxochromane groups, 1,3-indandione groups, 1,3-cyclohexanedione groups, benzoylacetanilide groups, 2-(2'-cyanoacetyl)-coumarone groups, pivaloylacetanilide groups, p-nitrophenylacetic ester groups and α-cyanoacetophenone groups.

Further, the aromatic group or non-aromatic heterocyclic (or aliphatic) active methylene-(or methyne-) containing group may be substituted with various kinds of substituents such as an alkyl group, an aryl group, an alkoxy group, an aryloxy group, halogen, nitro, cyano, an acyloxy group, an aralkyl group, hydroxyl, an amino group, a carbamoyl group, a sulfamoyl group or an arylamino group.

The above-mentioned developer group is preferably a group having at least two hydroxyl groups and having developing effect on silver halide. The typical examples of this group include such as an o-dihydroxyphenyl group, a p-dihydroxyphenyl group and a 2,3,4-trihydroxyphenyl group, and these groups include those substituted with halogen or alkyl, while the group having preferable effect in this invention is p-dihydroxyphenyl or halogen- or alkyl-substituted p-dihydroxyphenyl. The precursor of the group capable of developing silver halide is such as a silver halide-developer group having a hydroxyl group or groups which are acylated so that said group loses its function to develop silver halide under ordinary circumstances but can recover said function by reaction with an alkaline processing solution. The typical examples of the aforesaid acylation of the hydroxyl group include, for example, acetylation, trifluoroacetylation, butyrylation, formylation and ethoxycarbonylation.

The developer group or its precursor is attached to any desired position of X, Y and Z in formula (I), which group preferably contains a linking part which can bond both not so as to impair the functions of both. The linking part, however, is preferably connected to at least either of X and Z in the general formula (I). As the linking part, various divalent organic groups can be used and the typical examples thereof are —CO—, —N(an alkyl group)—, —NH—, —S—, —O—, —SO$_2$—, alkylene, arylene, a divalent alicyclic group, a divalent heterocyclic group and a divalent organic group comprising the combination of these groups.

While the monoazo type dye developer contains 1 to 4 of the developer groups or the precursors thereof, it is preferable that 1 to 2 of them are present therein.

When such an oxygen containing group as an alkoxy group a hydroxyl group including the tautomer thereof or a group yielding the hydroxyl group by hydrolysis is introduced into at least one of the X, Y and Z, the desired result can be obtained because the elution of this monoazo type dye developer is excellent. Said group yielding a hydroxyl group by hydrolysis is, for example, an acyloxy group. Among the oxygen-containing group, preferred are the hydroxy group and the group yielding the hydroxyl group.

In case of using, in this invention, the monoazo dye developer in which the oxygen-containing group is introduced into at least one of X, Y and Z in the general formula (I) and in which Y is a naphthylene or phenylene group, said naphthylene group being bonded with an azo group at its α-position and provided at its 4-position with the oxygen-containing group, or said phenylene group being provided at its 4-position with the oxygen-containing group, more preferable result can be obtained because such monoazo type dye developer is excellent in good elutability and has a high molar extinction coefficient.

The typical examples of the dye developer which can be used in this invention will be illustrated in the following but without limiting the invention thereto:

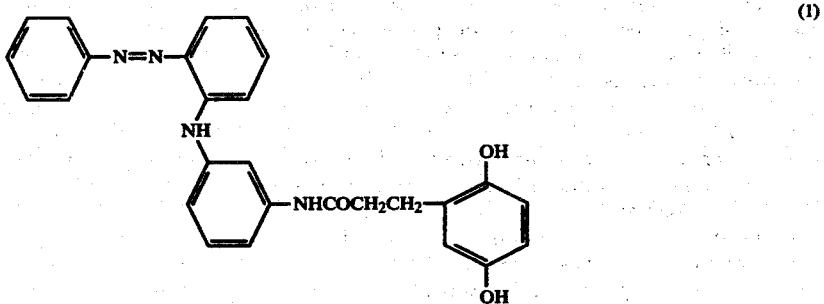

(1)

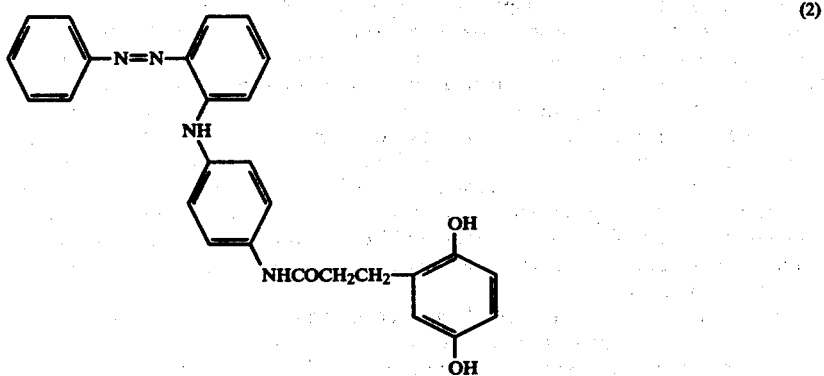

(2)

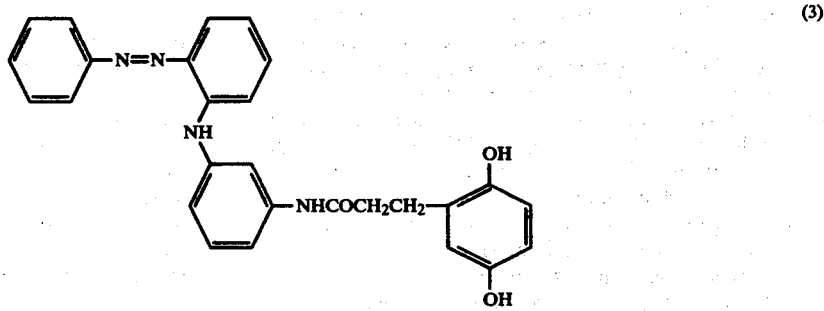

(3)

-continued
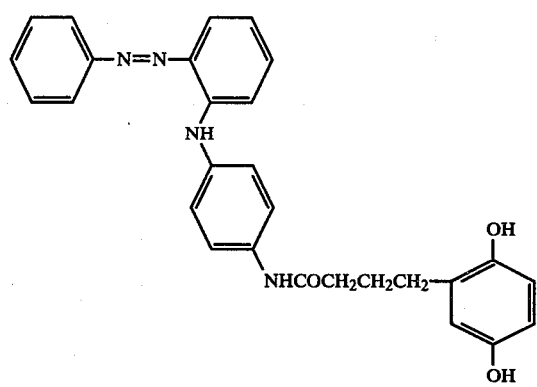
(4)
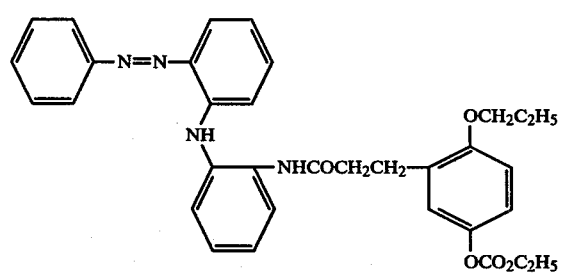
(5)
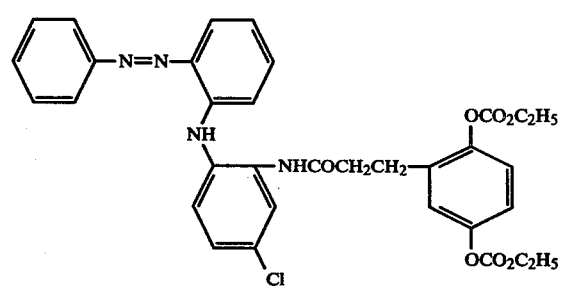
(6)
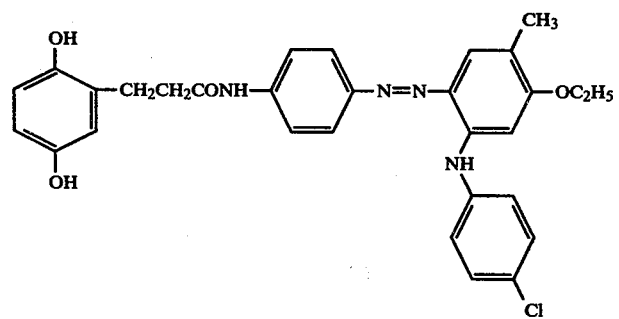
(7)
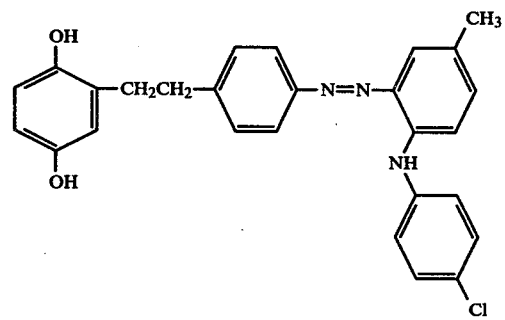
(8)

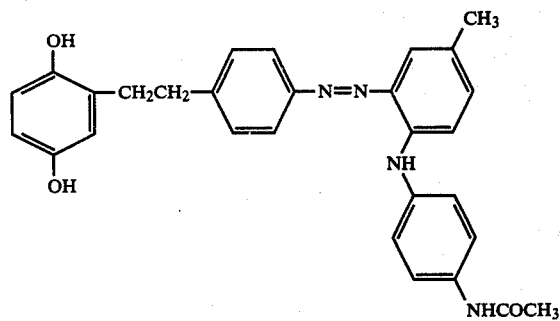
(9)
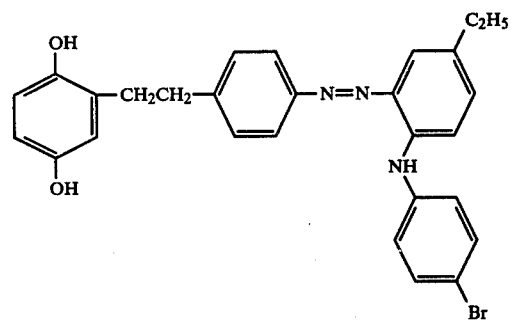
(10)
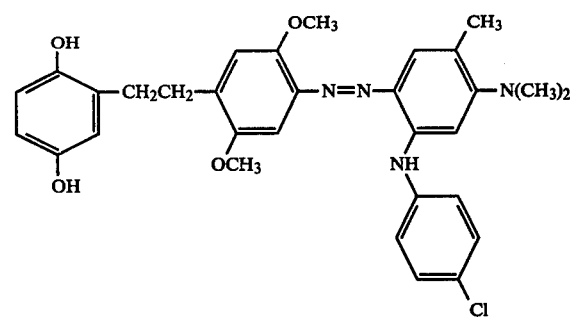
(11)
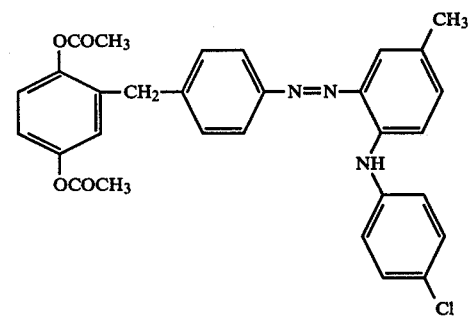
(12)
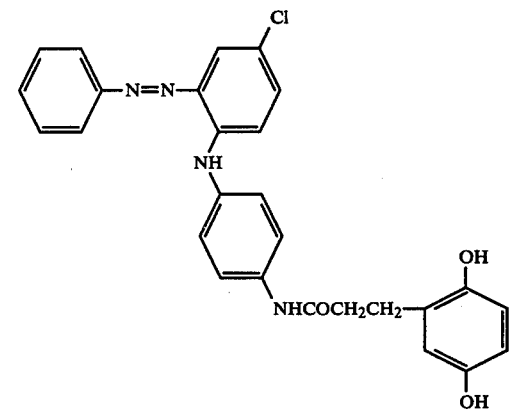
(13)

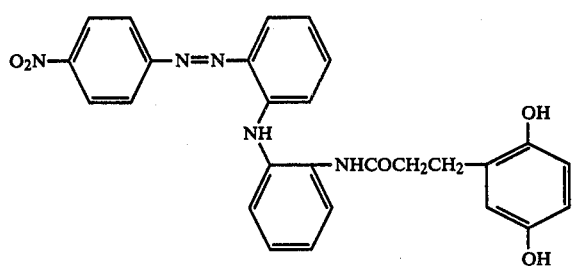
(14)
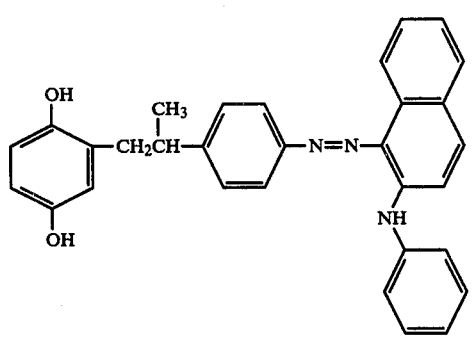
(15)
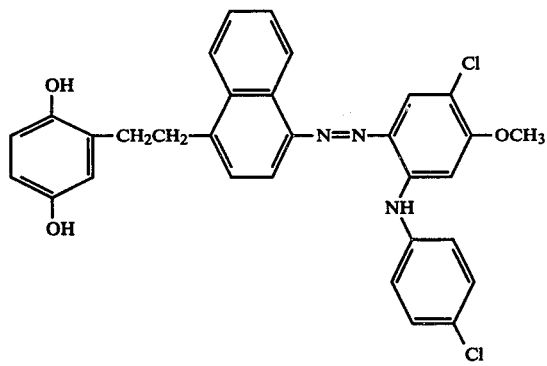
(16)
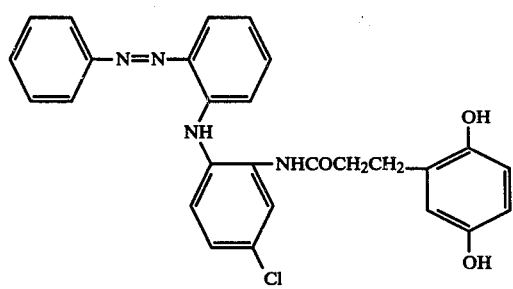
(17)
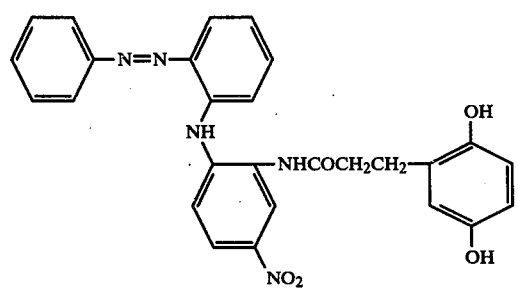
(18)

-continued
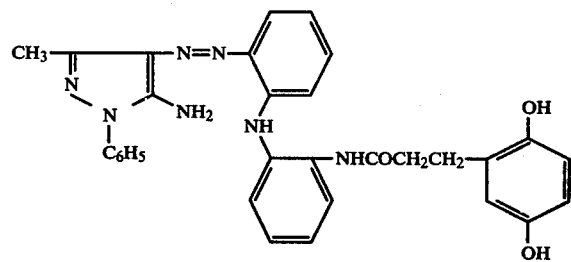
(19)
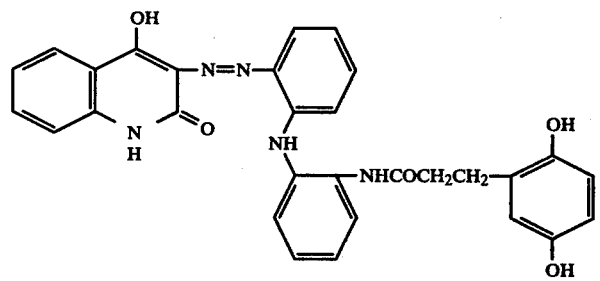
(20)
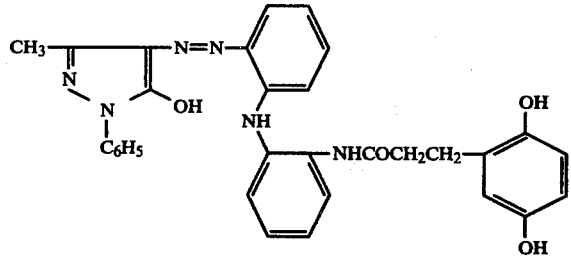
(21)
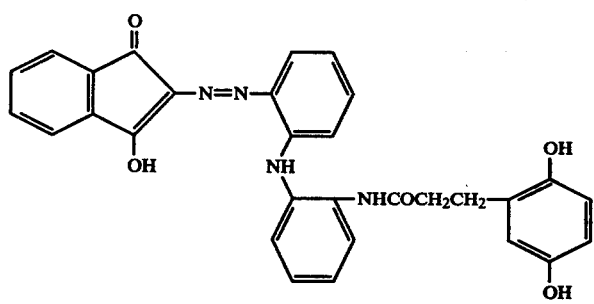
(22)
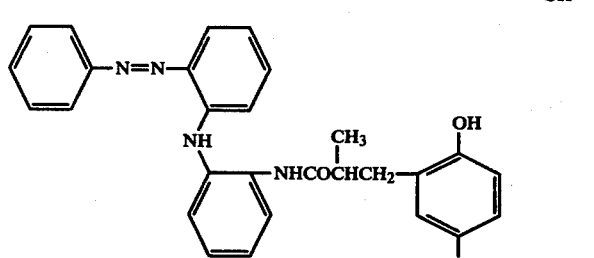
(23)
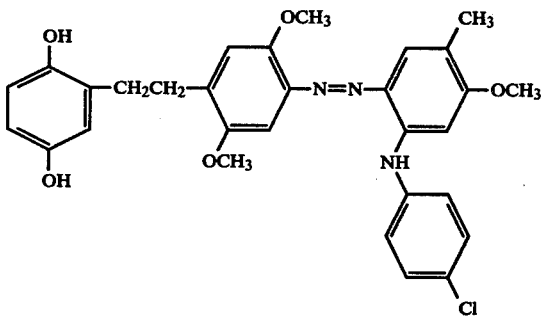
(24)

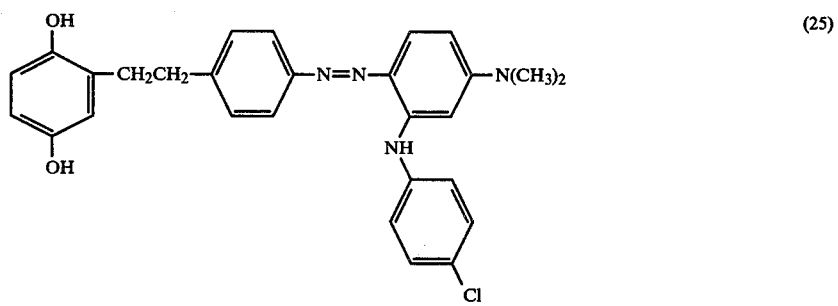
(25)
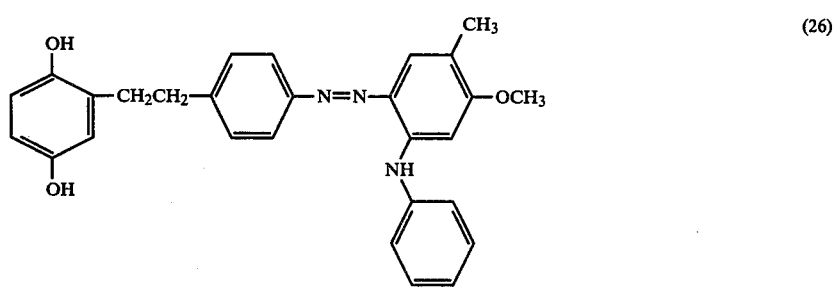
(26)
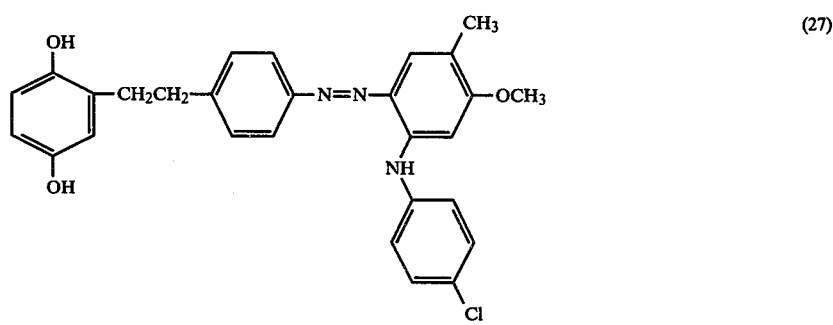
(27)
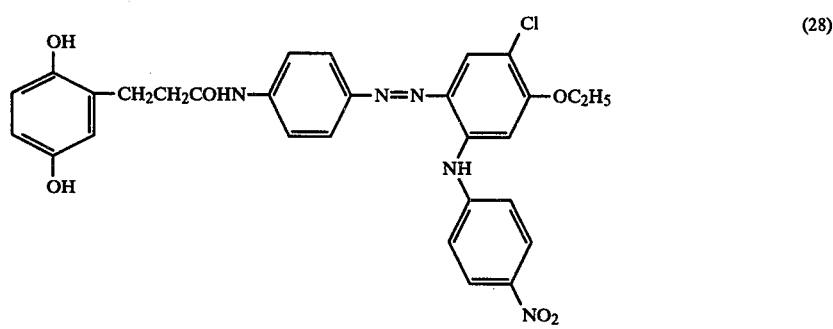
(28)
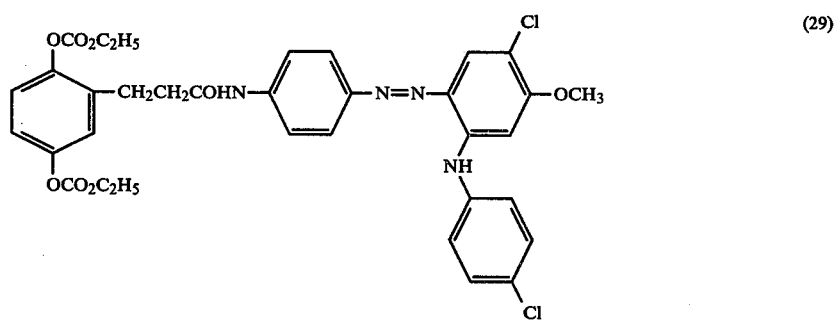
(29)

(30)
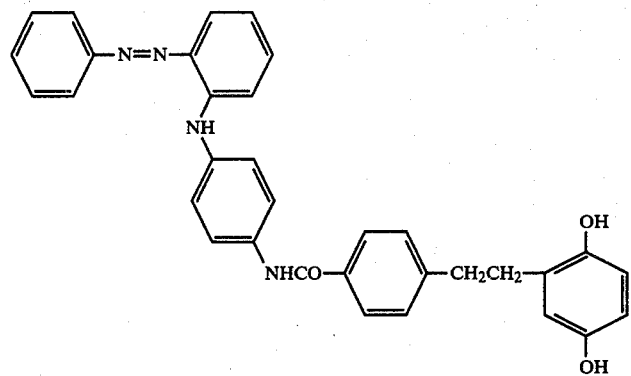
(31)
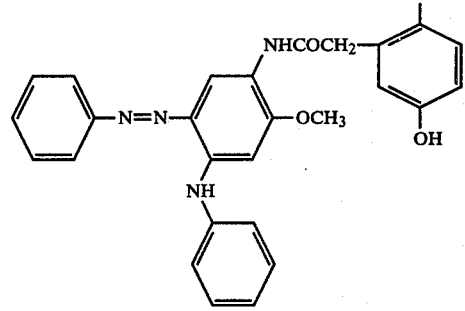
(32)
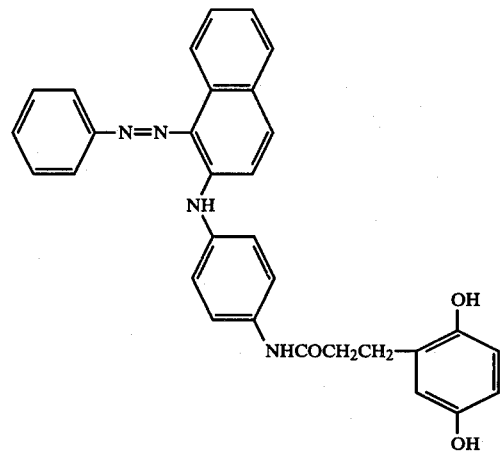
(33)
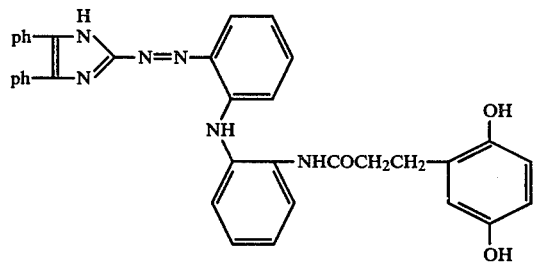
(34)
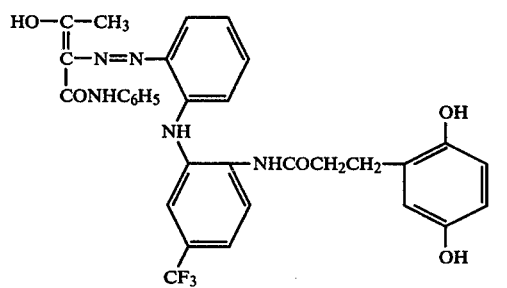

-continued
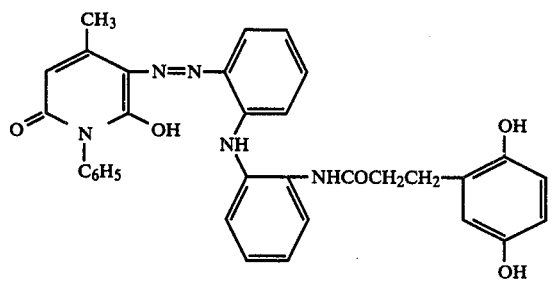
(35)
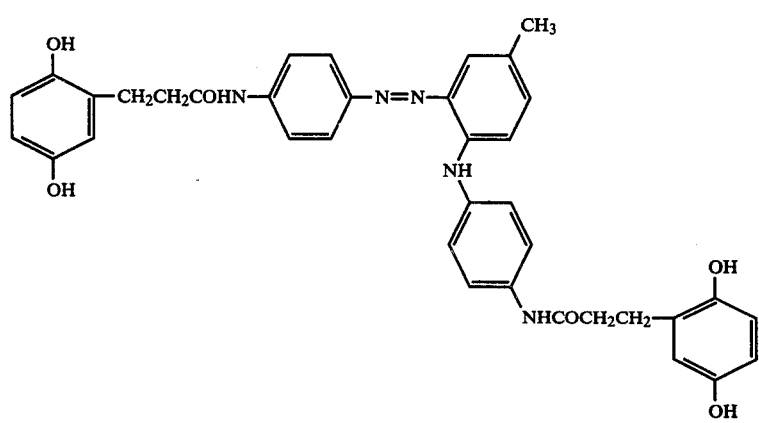
(36)
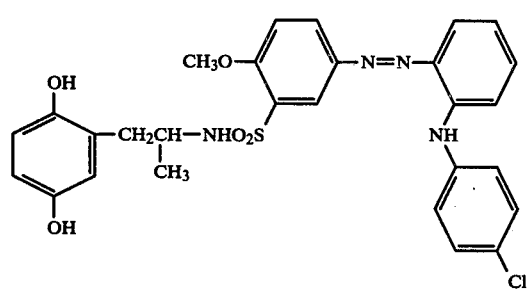
(37)
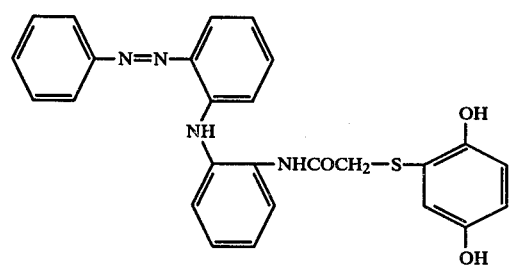
(38)
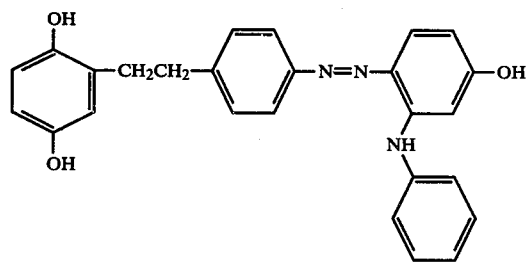
(39)

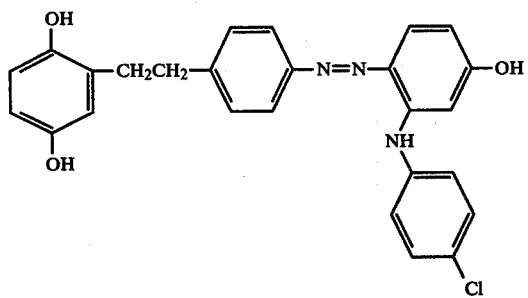
(40)
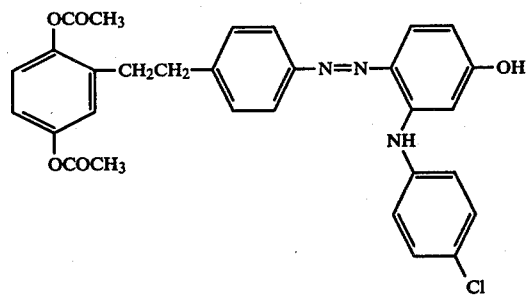
(41)
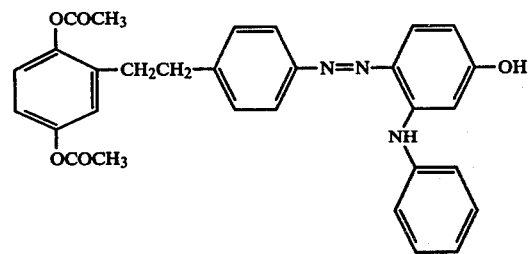
(42)
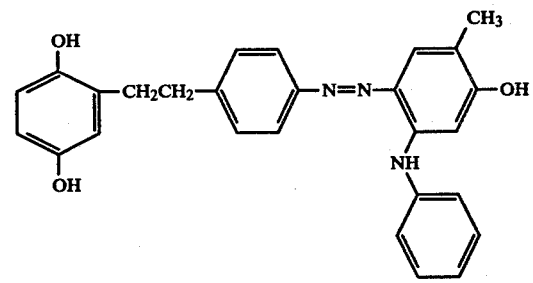
(43)
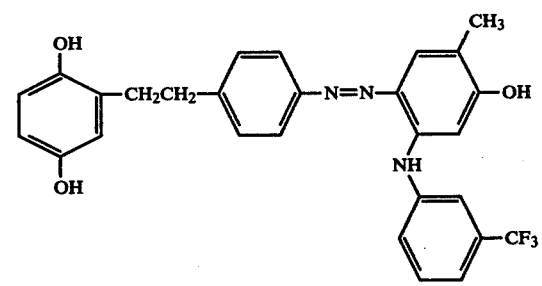
(44)
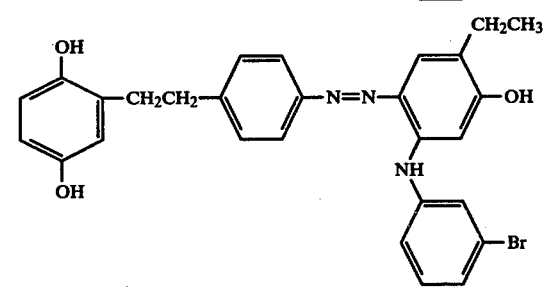
(45)

-continued
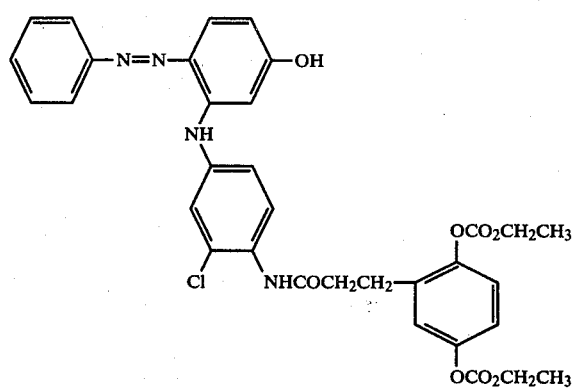
(46)
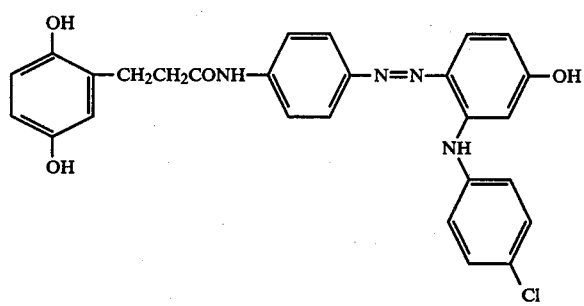
(47)
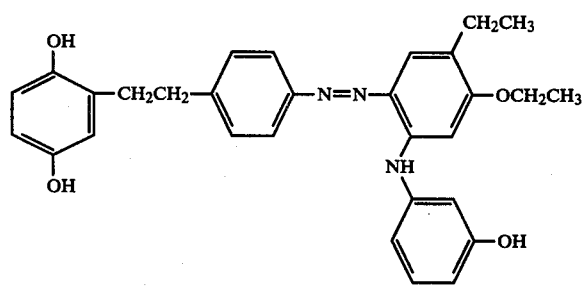
(48)
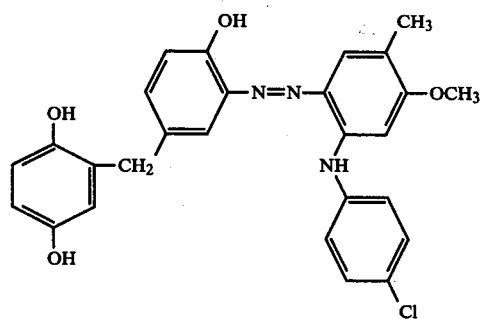
(49)
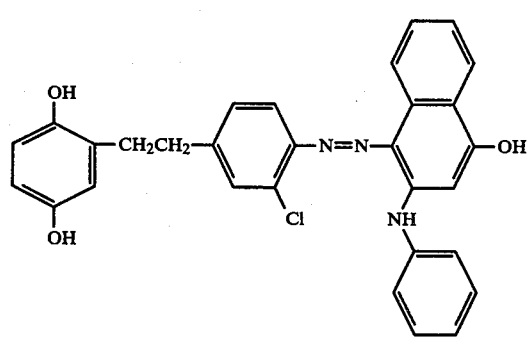
(50)

(51)
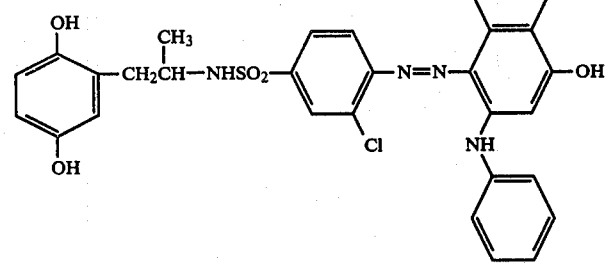
(52)
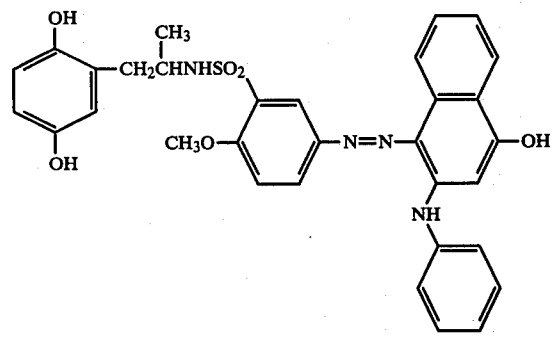
(53)
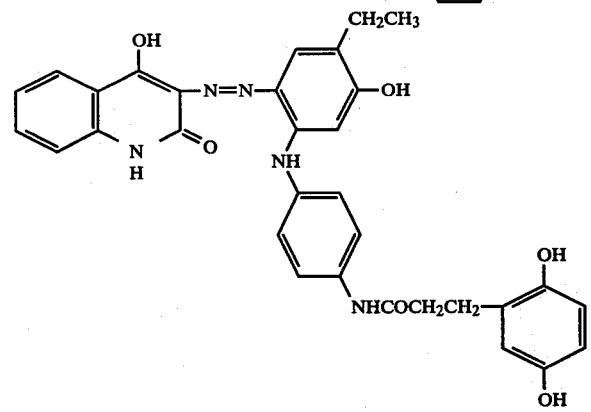
(54)
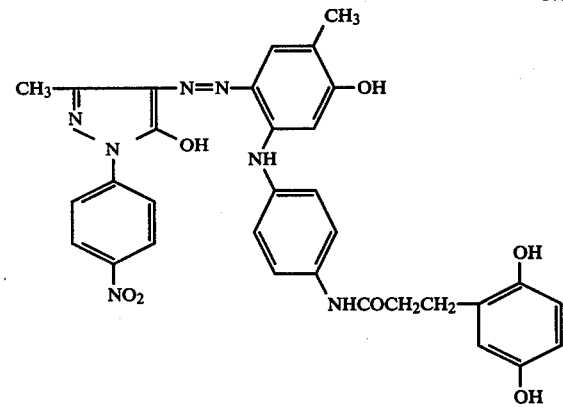
(55)
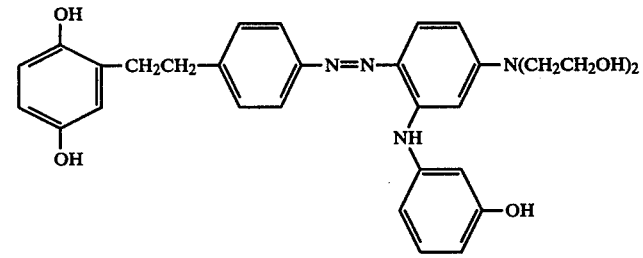

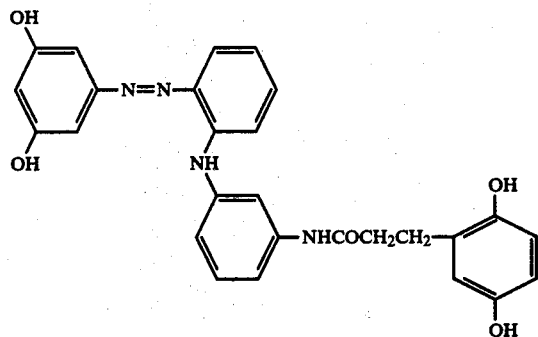
(56)
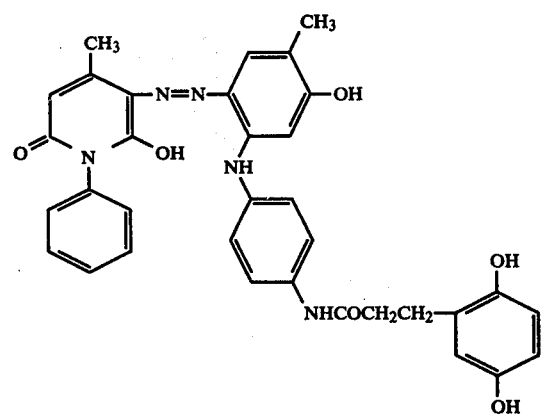
(57)
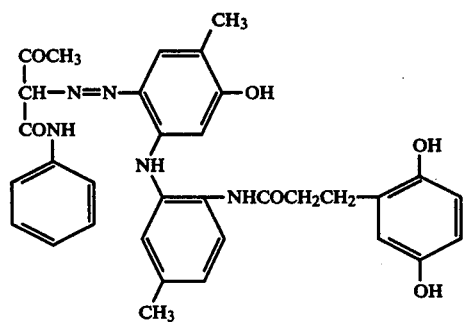
(58)
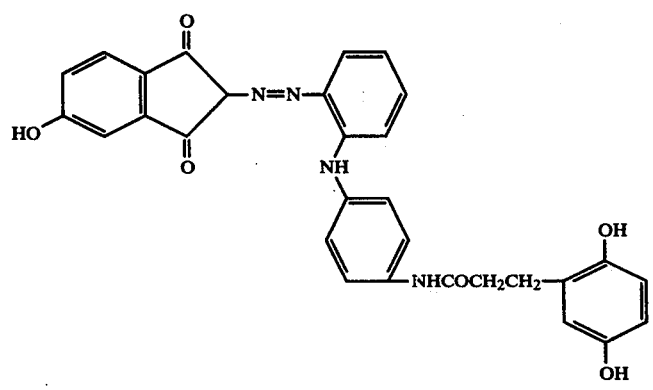
(59)

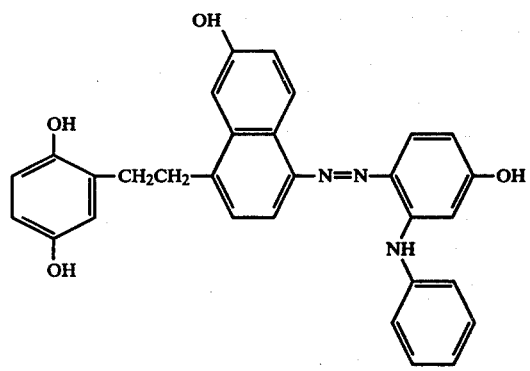
(60)
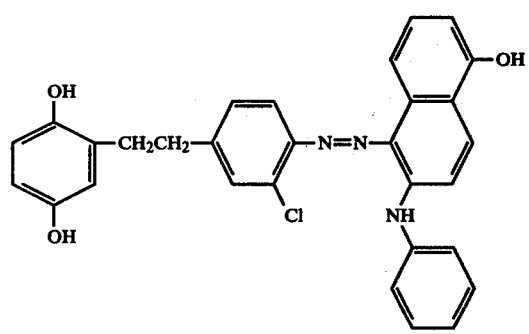
(61)
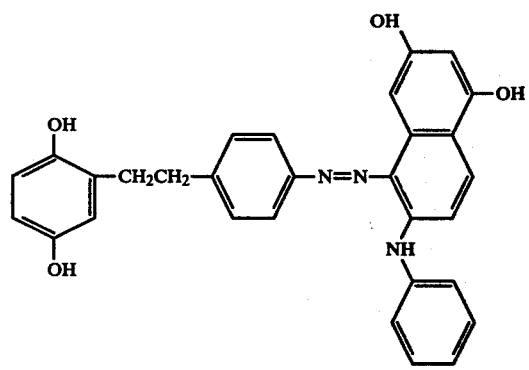
(62)
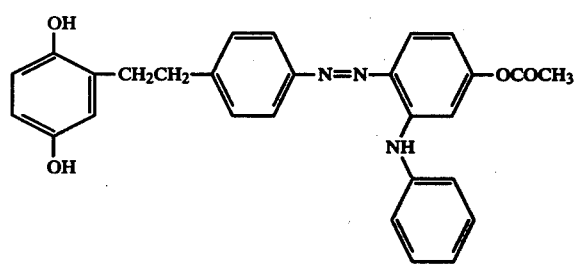
(63)
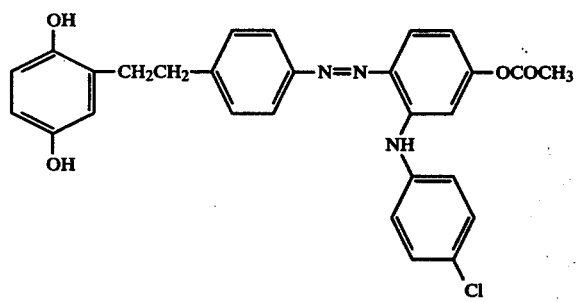
(64)

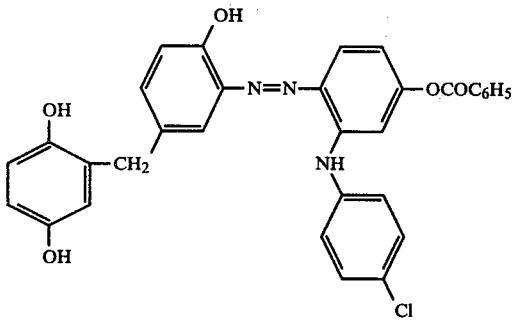
(65)

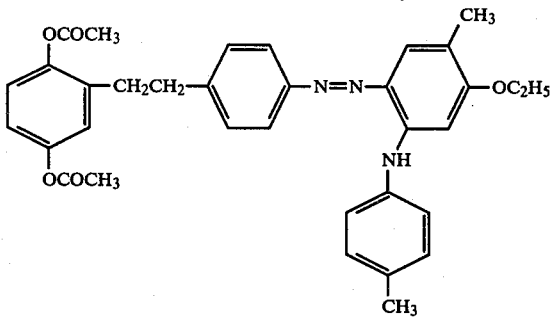
(66)

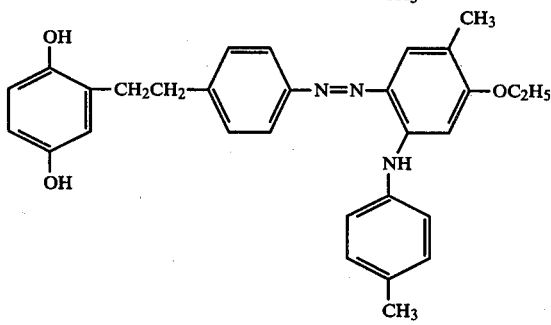
(67)

The monoazo type dye developer used in this invention is prepared according to the following procedures.

An aminoazo compound having an amino group on an aromatic group bonded with an azo group is reacted with a halogen-substituted aromatic compound to introduce an aromatic group into said amino group. Alternatively, an aromatic diazonium salt having an amino group substituted with an aromatic group and an azo coupler, or an aromatic diazonium salt and an azo coupler having an amino group substituted with an aromatic group, are subjected to the coupling reaction to form an azo compound having an amino group substituted with an aromatic group. Then, the developer moiety in an oxidized form is introduced into the above-mentioned azo compound having an amino group substituted with an aromatic group and then reduced thereby to prepare the dye developer used in this invention. Either, the developer moiety may be presented as a precursor of a group capable of developing silver halide. In the latter case, the aforesaid precursor as presented is required only to be hydrolyzed, but, even if the precursor is not subjected to hydrolysis, the dye developer having the precursor of a silver halide-developing group as its developer moiety may be used as such in this invention. Further, the monoazo type dye developer used in this invention can be prepared by introducing beforehand the developer moiety in its oxidized form or the precursor thereof into a starting material or intermediate in the process of preparing the azo compound having an amino group substituted with an aromatic group.

Concrete synthesis examples for the monoazo type dye developer used in this invention will be illustrated, as follows:

SYNTHESIS EXAMPLE 1

Preparation of compound (5)

8.1 g (0.026 mole) of β-(2,5-dicathyloxyphenyl)-propionic acid was dispersed into 100 ml of thionyl chloride and the resulting dispersion was refluxed for 4 hours. The dispersion was placed under a reduced pressure to evaporate the solvent and added with 30 ml of dry benzene. The mixture was again placed under the reduced pressure to evaporate the benzene and the remaining thionyl chloride and diluted by adding 30 ml of benzene thereto to prepare the corresponding acid chloride solution. 5.5 g (0.02 mole) of 2-amino-2'-phenylazodiphenylamine in a flask was dissolved by adding 50 ml of benzene and 10 ml of hexane. The resulting solution was added with 8 ml of dimethylaniline. Into the resulting mixture, the aforesaid acid chloride solution was added dropwise at 0° C. While the temperature was increased gradually up to a room temperature, the mixture was stirred for 4 hours. Then, it was diluted with 400 ml of benzene, washed with 200 ml of water and 10 ml of aqueous ammonia, further washed with diluted hydrochloric acid and water, and added with sodium sulfate. The resulting mixture was left alone over night and then filtered. The filtrate was subjected to evaporation under a reduced pressure to obtain a red solid. The solid mass was recrystallized from ethanol-water to yield 9.0 g of red crystalline needles having m.p. 109°–110° C. and $\lambda_{max}$ 458 nm (in methanol).

SYNTHESIS EXAMPLE 2

Preparation of compound (6)

The same procedures for the preparation of compound (5) were repeated but using 2-amino-4-chloro-2'-phenylazodiphenylamine, thereby to prepare the title compound. Yield of 72%, m.p. 145°–146° C. and $\lambda_{max}$ 450 nm (in methanol).

SYNTHESIS EXAMPLE 3

Preparation of compound (1)

1.0 g of sodium hydroxide was dissolved into a solvent mixture of 30 ml of ethanol and 10 ml of water. The resulting solution was cooled to 0° C. and 5 ml of an acetone solution containing 1.0 g of compound (5) was added dropwise thereinto under a nitrogen atmosphere. The mixture was stirred at 0° C. for one hour, added with 100 ml of water and then with hydrochloric acid and aqueous ammonia to keep the mixture at pH 4. The precipitate resulting in the mixture was collected by filtration and recrystallized from ethanol-water to obtain 0.6 g of red crystalline needles having m.p. 116°–117° C. Yield of 82%, $\lambda_{max}$ 450 nm (in methanol).

SYNTHESIS EXAMPLE 4

Preparation of compound (17)

The same procedures for preparation of compound (1) were repeated but using compound (6) instead of compound (5). Yield of 85%, m.p. 172°–173° C. $\lambda_{max}$ 440 nm (in methanol).

SYNTHESIS EXAMPLE 5

Preparation of compound (39)

The compound (a) as referred herein is 3-(N-trifluoroacetylanilino)-4-[p-(2',5'-diacetoxyphenethyl)-phenylazo]phenol.

10.0 g of 3-hydroxydiphenylamine was dissolved into 20 ml of a fluoroacetic acid and then added with 20 ml of trifluoroacetic acid anhydride. The resulting mixture was refluxed for 30 minutes and then placed under a reduced pressure to evaporate a trifluoroacetic acid and trifluoroacetic acid anhydride. The residue was dissolved in 500 ml of ethanol.

Separately, 19.7 g of p-(2,5-diacetoxyphenethyl)-aniline hydrochloride was added with 200 ml of water and 20 ml of 35% hydrochloric acid. While the resulting mixture was stirred at 0°–3° C., 20 ml of an aqueous solution containing 4.1 g of sodium nitrite was added dropwise thereto. After stirring at 0° C. for 30 minutes, the resulting mixture was added with 0.4 g of a sulfamic acid and then with 30.0 g of sodium acetate to prepare an aqueous solution of a p-(2,5-diacetoxyphenethyl)-benzene diazonium salt.

This aqueous diazonium salt solution was added into the above-mentioned ethanol solution at below 5° C. Then, the resulting mixture was added with 300 ml of an aqueous saturated sodium bicarbonate solution and stirred for one hour while the temperature was allowed to increase up to a room temperature. The resulting oily material was extracted with ethyl acetate, washed with water and dried. Then, ethyl acetate was evaporated under a reduced pressure. The residue was purified by means of silica gel column chromatography and reprecipitated from benzene/n-hexane to prepare a crystalline mass. It was collected by filtration and dried to obtain 19.6 g of yellow crystals (compound (a)) having m.p. 80°–83° C.

5.0 g of compound (a) thus prepared was dissolved into 200 ml of ethanol and the solution was added under a nitrogen atmosphere with 10 ml of degassed 25% sodium hydroxide. The mixture was stirred at a room temperature for one hour and then neutralized with 2 N hydrochloric acid. The product was extracted with ethyl acetate, water-washed and dried. After ethyl acetate was evaporated under a reduced pressure, the residue was purified by means of silica gel column chromatography, reprecipitated from ethyl acetate/n-hexane to prepare 2.6 g of reddish orange crystals having m.p. 206°–208° C.

SYNTHESIS EXAMPLE 6

Preparation of compound (40)

Compound (b) as referred herein is 3-[(N-trifluoroacetyl-p-(chloroanilino)]-4-[p-(2',5'-diacetoxyphenethyl)phenylazo]phenol.

The same procedures for preparation of compound (a) were repeated except for using 3-[4-chloroanilino]-phenol instead of 3-hydroxydiphenylamine, thereby to prepare compound (b) having m.p. 65°–69° C. Then, the same procedures for preparation of compound (39) were repeated except for using compound (b) instead of compound (a), thereby to prepare compound (40) having m.p. 184°–186° C. and $\lambda_{max}$ 443 nm (in methanol).

SYNTHESIS EXAMPLE 7

Preparation of compound (66)

4.0 g (12 m.mole) of p-(2,5-diacetoxyphenethyl)-aniline hydrochloride was dissolved into 100 ml of an aqueous solution containing 2 ml of concentrated hydrochloric acid. 10 ml of an aqueous solution containing 0.8 g (12 m. mole) of sodium nitrite was added dropwise thereinto at 0°–5° C. while stirring. After 30 minutes, the solution was added with 100 mg of sulfamic acid and then added with 2 g of sodium acetate to make the solution weakly acidic.

Separately, 200 ml of an ethanol solution containing 2.9 g (12 m. mole) of 3-ethoxy-4,4'-dimethyldiphenylamine was added with the aforesaid diazotized solution at 0° C. and added further with saturated sodium bicarbonate to make its pH weakly alkaline. Then, the solution was stirred for two hours at a room temperature, extracted with ethyl acetate, washed with water and dried. After the solvent was evaporated, the recrystallization from benzene-methanol was carried out to prepare 5.6 g of red crystals having m.p. 148.5°–150.0° C. Yield of 83%, $\lambda_{max}$ 469 nm (in methanol).

SYNTHESIS EXAMPLE 8

Preparation of compound (67)

3.0 g (5.3 m. mole) of compound (66) was dispersed into 60 ml of methyl cellosolve and the mixture was added with 6 ml of 25% sodium hydroxide under a nitrogen atmosphere. The resulting mixture was stirred at a room temperature for two hours, then neutralized with 2 N hydrochloric acid, and subjected to extraction with ethyl acetate, followed by water-washing and drying. The ethylacetate solution was concentrated, then poured into n-hexane to obtain 1.7 g of a red material having m.p. 115°–120° C. and filtered. The filtrate was further concentrated and reprecipitated to yield 0.6 g of the above-mentioned material. Total 2.3 g. Yield of 88%. m.p. 115°–120° C. $\lambda_{max}$ 468 nm (in methanol).

According to such processes as shown in the above synthesis examples, various kinds of monoazo type dye developers can be prepared. Among the monoazo type dye developers thus prepared, compounds (1) to (63) were subjected to elementary analyses to show the results in the following table:

| Exemplified Compound | Elementary Analysis Value (%) | | | | | |
|---|---|---|---|---|---|---|
| | Calculated | | | Found | | |
| | C | H | N | C | H | N |
| 1 | 71.67 | 5.35 | 12.38 | 71.55 | 5.37 | 12.36 |
| 2 | 71.67 | 5.35 | 12.38 | 71.57 | 5.36 | 12.35 |
| 3 | 71.67 | 5.35 | 12.38 | 71.72 | 5.31 | 12.42 |
| 4 | 72.08 | 5.62 | 12.01 | 71.89 | 5.48 | 12.11 |
| 5 | 66.43 | 5.41 | 9.39 | 66.28 | 5.45 | 9.52 |
| 6 | 62.81 | 4.95 | 8.88 | 62.96 | 4.78 | 8.80 |
| 7 | 66.11 | 5.36 | 10.28 | 65.91 | 5.54 | 10.10 |
| 8 | 70.81 | 5.28 | 9.18 | 70.62 | 5.56 | 9.20 |
| 9 | 72.48 | 5.87 | 11.66 | 72.58 | 6.05 | 11.55 |
| 10 | 65.12 | 5.08 | 8.14 | 65.41 | 5.28 | 7.87 |
| 11 | 66.36 | 5.93 | 9.99 | 66.06 | 6.13 | 9.88 |
| 12 | 68.24 | 4.96 | 7.96 | 68.90 | 5.08 | 7.69 |
| 13 | 66.60 | 4.76 | 11.51 | 66.38 | 5.02 | 11.35 |
| 14 | 65.18 | 4.66 | 14.08 | 64.93 | 4.90 | 13.98 |
| 15 | 78.62 | 5.75 | 8.87 | 78.39 | 5.60 | 9.05 |
| 16 | 66.67 | 4.51 | 7.52 | 67.00 | 4.62 | 7.48 |
| 17 | 66.60 | 4.76 | 11.51 | 66.51 | 4.91 | 11.68 |
| 18 | 65.18 | 4.66 | 14.08 | 65.32 | 4.49 | 13.93 |
| 19 | 67.99 | 5.34 | 17.90 | 66.82 | 5.22 | 17.77 |
| 20 | 67.28 | 4.71 | 13.08 | 67.49 | 4.52 | 13.17 |
| 21 | 67.87 | 5.14 | 15.32 | 68.02 | 5.01 | 15.52 |
| 22 | 69.22 | 4.65 | 10.76 | 68.99 | 4.39 | 10.70 |
| 23 | 72.08 | 5.62 | 12.01 | 72.17 | 5.46 | 11.88 |
| 24 | 65.75 | 5.52 | 7.67 | 65.84 | 5.29 | 7.45 |
| 25 | 69.06 | 5.59 | 11.50 | 68.78 | 5.62 | 11.44 |
| 26 | 74.15 | 6.00 | 9.26 | 73.87 | 6.13 | 9.33 |
| 27 | 68.92 | 5.37 | 8.61 | 68.87 | 5.43 | 8.57 |
| 28 | 60.47 | 4.55 | 12.16 | 60.52 | 4.63 | 12.06 |
| 29 | 58.71 | 4.64 | 8.06 | 58.82 | 4.37 | 8.26 |
| 30 | 74.98 | 5.34 | 10.60 | 74.73 | 5.09 | 10.90 |
| 31 | 69.22 | 5.16 | 11.96 | 69.09 | 5.44 | 11.69 |
| 32 | 74.09 | 5.22 | 11.15 | 73.88 | 5.45 | 11.08 |
| 33 | 72.71 | 5.08 | 14.13 | 72.65 | 4.98 | 14.32 |
| 34 | 62.03 | 4.55 | 11.30 | 62.18 | 4.75 | 11.08 |
| 35 | 68.86 | 5.08 | 12.17 | 68.65 | 5.29 | 12.08 |
| 36 | 68.82 | 5.46 | 10.85 | 68.95 | 5.72 | 10.67 |
| 37 | 59.31 | 4.80 | 9.88 | 59.58 | 4.76 | 9.69 |
| 38 | 66.37 | 4.71 | 11.91 | 66.21 | 4.90 | 11.68 |
| 39 | 73.40 | 5.45 | 9.88 | 73.11 | 5.36 | 9.77 |
| 40 | 67.90 | 4.82 | 9.14 | 67.98 | 4.83 | 9.01 |
| 41 | 66.23 | 4.82 | 7.72 | 66.41 | 4.89 | 7.67 |
| 42 | 70.71 | 5.34 | 8.25 | 71.00 | 5.43 | 8.37 |
| 43 | 73.79 | 5.73 | 9.56 | 74.81 | 5.79 | 9.61 |
| 44 | 66.27 | 4.76 | 8.28 | 66.02 | 4.54 | 8.11 |
| 45 | 63.16 | 4.92 | 7.89 | 63.35 | 5.04 | 7.62 |
| 46 | 61.25 | 4.83 | 8.66 | 61.47 | 5.01 | 8.43 |
| 47 | 64.48 | 4.61 | 11.14 | 64.62 | 4.78 | 11.02 |
| 48 | 72.41 | 6.28 | 8.44 | 72.33 | 6.44 | 8.25 |
| 49 | 66.19 | 4.94 | 8.58 | 66.38 | 4.99 | 8.31 |
| 50 | 70.65 | 4.74 | 8.24 | 70.40 | 4.69 | 8.15 |
| 51 | 61.74 | 4.51 | 9.29 | 61.71 | 4.48 | 9.29 |
| 52 | 64.20 | 5.05 | 9.36 | 64.39 | 5.12 | 9.45 |
| 53 | 68.19 | 5.19 | 12.43 | 68.42 | 5.30 | 12.42 |
| 54 | 61.63 | 4.69 | 15.72 | 61.69 | 4.68 | 15.74 |
| 55 | 68.17 | 6.10 | 10.60 | 68.29 | 6.18 | 10.82 |
| 56 | 66.94 | 4.99 | 11.56 | 66.91 | 4.89 | 11.67 |
| 57 | 67.43 | 5.16 | 11.56 | 67.55 | 5.23 | 11.62 |
| 58 | 66.54 | 5.58 | 11.76 | 66.62 | 5.63 | 11.83 |
| 59 | 67.16 | 4.51 | 10.44 | 67.30 | 4.65 | 10.51 |
| 60 | 73.30 | 5.13 | 8.55 | 73.51 | 5.04 | 8.70 |
| 61 | 70.65 | 4.74 | 8.24 | 70.89 | 4.97 | 8.06 |
| 62 | 73.30 | 5.13 | 8.55 | 73.46 | 5.02 | 8.49 |
| 63 | 71.93 | 5.39 | 8.99 | 71.68 | 5.32 | 9.07 |
| 64 | 67.00 | 4.82 | 8.37 | 66.85 | 4.67 | 8.51 |
| 65 | 67.92 | 4.27 | 7.42 | 68.05 | 4.13 | 7.53 |
| 66 | 72.19 | 6.24 | 7.43 | 72.33 | 6.12 | 7.26 |
| 67 | 74.81 | 6.49 | 8.73 | 74.63 | 6.68 | 8.59 |

In order to form a dye image by using the thus prepared monoazo type dye developer in this invention, it is preferable to employ a color diffusion transfer process, but it may also be possible, if desired, to employ a silver dye bleach process which said monoazo type dye is incorporated into a photosensitive element or a developer. According to a diffusion transfer dye image forming process, a positive dye image can be prepared on an image-receiving element, and at the same time, a negative dye image can be prepared in a light-sensitive element which image is made solely of dyes by desilvering the light-sensitive element. Further, a monochromatic dye image or a bichromatic dye image for e.g. pseudocolor photograph can be prepared by using one or two pairs of combinations of a silver halide emulsion and the monoazo type dye developer. The photographic materials to which this invention may be applied include, in addition to the photographic materials for color diffusion transfer process, negative, reversal or direct positive films and papers of the so-called Kodacolor or Kodachrome type. The photographic material having more preferable effect in the invention, however, is a color diffusion transfer photographic material.

The color diffusion transfer photographic material comprises a photographic element containing a light-sensitive silver halide emulsion and an image-receiving element which is dyeable.

The photographic element usable in the invention contains a silver halide emulsion and a dye image-forming material.

The silver halide emulsion is a hydrophilic colloidal dispersion of silver bromide, silver iodide, silver chloride, silver iodobromide, silver chlorobromide, silver chloroiodide, silver chloroiodobromide or a mixture of these silver halides and the silver halide emulsion may include, in addition to an ordinary emulsion, such emulsions prepared in various processes as the so-called conversion emulsion, the Lippmann emulsion and the direct positive emulsions prefogged or of the internal latent image type. And, the grain size, the contents, the proportion or the like of silver halides varies according to the kind of the light-sensitive photographic materials to be used.

As a hydrophilic protective colloid in which silver halide grains are dispersed, natural or synthetic colloidal materials such as gelatin, gelatin derivatives and polyvinyl alcohols are used singly or in combination.

The above-mentioned silver halides can be chemically sensitized with active gelatin, sulfur sensitizers such as allylthiocarbamide, thiourea and cystine, selen sensitizers, noble metal sensitizers or such sensitizer as gold, ruthenium, rhodium and iridium sensitizers, singly or in appropriate combination. The silver halides, further, can be optically sensitized with such as a cyanine dye or a merocyanine dye. Generally, three kinds of the silver halide emulsions which differ in their respective light-sensitive wavelength region can be used to prepare a light-sensitive color photographic material.

The silver halide emulsion, moreover, can be stabilized with triazoles, tetrazoles, imidazoles, azaindenes, quaternary benzothiazolium compounds, zinc compounds or cadmium compounds and can also contain a sensitizing compound of a quaternary ammonium salt type or polyethyleneglycol type. Furthermore, the silver halide emulsion can contain various photographic additives including such suitable plasticizer for gelatin as glycerol, dihydroxyalkanes like 1,5-pentadiol, ethylenebisglycolic acid esters, bis-ethoxy-diethyleneglycolsuccinates, acrylic amide latices, such gelatin hardener as formaldehyde, halogen-substituted aliphatic acids like formaldehyde and mucobromic acid, compounds having an acid anhydride group, dicarboxylic acid chlorides, biesters of methanesulfonic acid, sodium bisulfite derivatives of an dialdehyde in which aldehyde groups are separated by 2 to 3 carbon atoms, such coating aid as saponin, and such coating aid as sulfosuccinate. Furthermore, various other additives ordinarily used for photography, such as anti-fogging agents and ultraviolet absorbing agents, can also be contained in the silver halide emulsion, if necessary.

The photographic element comprises the combination of the aforesaid silver halide emulsion and a dye developer. By using one or two pairs of said combinations, a monochromatic dye image or a bichromatic dye image for e.g. pseudo-color photograph can be obtained. Further, for example, in case of being used for a color diffusion transfer process according to a multichromatic color subtractive process, a blue light-sensitive silver halide emulsion, a green light-sensitive silver halide emulsion and a red light-sensitive silver halide emulsion are respectively combined with a yellow dye developer, a magenta dye developer and a cyan dye developer. The preferable layer arrangement comprises a blue light-sensitive emulsion, a green light-sensitive emulsion and a red light-sensitive emulsion being coated successively from the exposure side. In this arrangement, a yellow filter layer may be placed between a blue light-sensitive emulsion and a green light-sensitive emulsion. While the respective combinations of the light-sensitive silver halide emulsions and the dye developers may be carried out in such way as to respectively add them into the different layers adjacent to the emulsion layers or to add them into the corresponding silver halide emulsion layers respectively. The former way is better to obtain natural color photograph.

Further, two or three of the combinations of the silver halide emulsions and the dye developers can be coated in the same layer according to such mixed packet process as disclosed in U.S. Pat. No. 2,800,458.

The dye developer used in this invention is dissolved with as small an amount of an organic solvent as possible and dispersed into a hydrophilic protective colloid, such as gelatin or polyvinylalcohol. As said organic solvent, a high boiling solvent, a low boiling solvent which can be removed by evaporation from the dispersion, or an organic solvent easily soluble in water can be used singly or in combination.

The examples of a particularly preferred high boiling solvent in the invention include N-n-butylacetoanilide, diethyllaurylamide, dibutyl phthalate and tricresyl phosphate. As the low boiling solvent, ethyl acetate, methyl acetate, cyclohexanone and the like are useful. These low boiling solvents can be removed by evaporation at the time of drying after it is coated in a layer, or in such process as disclosed in U.S. Pat. No. 2,801,171.

As an easily water-soluble organic solvent, 2-methoxyethanol, dimethylformamide and the like can be used.

Further, instead of or in addition to said high boiling solvent, various kinds of lipophilic polymers can be used. Such polymers include, for example, polyvinylacetate, polyacrylicesler, and polyester of polyhydric alcohol and polybasic acid.

Such processes as disclosed in Japanese Patent Publication Nos. 13,837/68 and 32,131/73, U.S. Pat. No. 3,832,173 and Japanese Laid-open-to-public Patent Publication No. 17,637/75 are useful in this invention to disperse a dye developer.

Such dye developer as having a carboxyl group or a water-soluble group like a sulfo group may be dissolved into water or an alkaline aqueous solution and then dispersed into a hydrophilic protective colloid or, if desired, neutralized.

While the amount of the dye developer used in the invention can be varied widely according to the kind of compounds to be used and to the desired purpose, it is preferable, for example, to use about 0.5 to about 10 wt. % of the dye developer in an water-soluble organic colloid coating solution.

In case of carrying out a multi-color diffusion transfer process, it is advantageous to use an inter layer in the photographic element. The inter layer comprises, a hydrophilic polymer such as gelatin, polyacrylamide, calcium alginate, partial hydralizate of polyvinylacetate and hydroxypropylcellulose, and further such a porous polymer formed from a latex of a hydrophilic polymer and a hydrophobic polymer as disclosed in U.S. Pat. No. 3,625,685.

Such compounds as disclosed in U.S. Pat. Nos. 3,384,483, 3,421,892, 3,427,158, 3,121,011, 3,043,692, 3,069,263, 3,615,422, 3,625,685, 3,756,816 and 3,069,214 can be also used as the inter layer.

As a support of the photographic element in the invention, various natural or synthetic polymeric materials such as paper, glass, cellulose nitrate, cellulose acetate, polyvinylacetal, polycarbonate, polystyrene, polyethylene terephthalate, polypropylene and polyethylene can be also used and they may be either transparent or opaque according to the intended use purpose.

Such vapor-permeable support or oxygen barrier support as disclosed in U.S. Pat. No. 3,573,044 can also be advantageously used. In case of a transparent support, it is preferred that the said support is colored to such an extent as not to prevent the exposure and the visual observation of formed images but as to inhibit the emulsion layer from being fogged with light piping coming into the emulsion layer from the sides of the support.

It is preferable that the image receiving element contains a mordant. The mordant suitable to the image receiving element may be any of those which have preferable mordanting effect on a diffusible dye developer on the way of diffusion transfer. The useful examples of the said mordant are poly-4-vinylpyridine, poly-4-vinyl-N-benzylpyridinium-p-toluenesulfonate and cetyl trimethylammonium bromide.

Such mordants as disclosed in U.S. Pat. No. 2,882,156, Belgian Pat. No. 729,202, U.S. Pat. Nos. 3,488,706, 3,859,096, 3,788,855, 3,227,148, 3,271,147, 3,709,690, 3,625,694, 3,770,439 and 3,756,814, and Japanese Laid-open-to-public Publication No. 61,228/75 can be used advantageously in this invention.

While the above-mentioned mordants are usually used in various binders such as gelatin, polyvinylalcohol, polyvinylpyrrolidone and completely or partially hydrolyzed cellulose ester, such binder as poly-N-methyl-2-vinylpyridine, N-methoxy-methyl-poly-hexamethylene adipamide, a copolymer or polymeric mixture of vinylalcohol and N-vinylpyrrolidone, partially hydrolyzed polyvinylacetate, acetylcellulose, gelatin, polyvinylalcohol or a guanylhydrazone derivative of an acylstyrene polymer can be used as a binder for an image receiving without the above-mentioned mordants since these have an ability of mordanting.

Such special case that the mordant is contained in an alkaline processing solution is possible as disclosed in Japanese Laid-open-to-public Publication No. 47,626/75.

The image receiving element can contain also various additives ordinarily used for the photography, such as an ultraviolet absorbing agent or a fluorescent whitening agent.

After the formation of a dye image is substantially completed after the diffusion transfer of diffusible dyes into the image receiving element resulting from application of an alkaline processing solution, it is preferred to reduce a pH value within a film unit to about neutrality so as to increase the stability of a dye image and substantially to stop further image formation in order to avoid a change or stain in the image which change or stain occurs at high pH. In view of this, it is advantageous to use an neutralizing layer containing such material as capable of reducing pH sufficiently. The useful examples of said material used in the invention are such polymeric acids or partial esters and acid anhydrides thereof as disclosed in U.S. Pat. No. 3,362,819, such higher aliphatic acids as disclosed in U.S. Pat. No. 2,983,606, and such solid acid metal salts as disclosed in U.S. Pat. No. 2,584,030.

Microcapsulization as disclosed in U.S. Pat. No. 3,576,625 can be also carried out.

It is, moreover, preferred to use a spacer layer in order to control a pH reducing rate. As a material for said spacer layer, for example, gelatin, hydroxypropylcellulose, partially hydrolyzed polyvinylacetateacryllatex, polyacrylamide, polyvinylalcohol, partially acetalized polyvinylalcohol and the mixtures of these compounds.

The alkaline processing solution used in the invention contains such ingredients as necessary to develop a silver halide emulsion and to form diffusible dyes and has strong alkalinity, generally over pH 10.

The alkaline processing solution used in the invention contains an alkali metal or alkali earth metal hydroxide, such as sodium hydroxide, calcium hydroxide, potassium hydroxide or lithium hydroxide, or sodium carbonate, diethylamine or the like. Further, the processing solution can be added with such development restrainer as benzotriazole or with such thickner as hydroxyethylcellulose or a sodium carboxymethylcellulose salt. It is desirable in the invention to add such onium compound as quaternary ammonium salt into the processing solution. While the typical examples of the particularly preferred onium compound are 1-benzyl-2-picolium bromide and 1-phenethyl-2-picolium bromide, such onium compounds as disclosed in U.S. Pat. Nos. 3,411,904 and 3,173,786 can be also used in the invention.

While the above-mentioned alkaline processing solution can be applied in various forms to the photographic element, it is preferable to hold the processing solution in a rupturable container so that, after the photographic element is exposed, the said solution is applied to the exposed photographic element by destroying the rupturable container by means of pressing members placed inside of a camera and/or a film unit cartridge.

As the rupturable container, such containers as disclosed in U.S. Pat. Nos. 2,543,181, 2,643,886, 2,723,051, 3,056,492 and 3,152,515 can be used.

It is possible that a development restrainer such as 1-phenyl-5-mercaptotetrazole or benzylaminopurine can be contained in any one of the photographic element, the image receiving element and the processing solution. It is advantageous in the invention to contain an auxiliary developing agent, such as a hydroquinone derivative like p-tolylhydroquinone, a catechol derivative or 1-phenyl-3-pyrazolidone, in any one of the photographic element, the image receiving element and the processing solution. The examples of the auxiliary developing agent used advantageously in the invention include any of those as disclosed in Japanese Patent Publication No. 17,383/60, U.S. Pat. Nos. 2,939,788, 3,192,044 and 3,462,266, British Pat. No. 1,243,539 and Japanese Laid-open-to-public Patent Publication Nos. 40,128/74, 83,440/74, 84,238/74 and 6,340/75. A process for adding the auxiliary developing agent to the photographic element or the image receiving element can be carried out according to such process as used for dispersing the aforesaid dye developer. The auxiliary developing agent may be also contained in the form of uniform distribution in the image receiving element, as disclosed in Japanese Laid-open-to-public Patent Publication No. 131,134/74.

The film unit used in the invention may be either a film unit in which the photographic element and the image receiving element are placed separately or a film unit comprising both integrally before the exposure. After processing, the photographic element and the image receiving element may be kept unitedly or stripped off. In case of using a film unit in which the photographic element and the image receiving element are placed separately before exposure or in which both are stripped off after processing, it is required to form the both elements on the respective supports.

The support of the image receiving element can be such as used in the case of the photographic element and may be either transparent or opaque according to the purpose.

The image receiving element can be also formed on a support in the photographic element. In this case, it is preferable to use a cover sheet which is placed on the top as disclosed in U.S. Pat. Nos. 3,594,164 and 3,594,165.

The background for a formed image is preferably a light reflecting layer having high whiteness. While the position of the light reflecting layer is not particularly limited, it is, however, better to form the light reflecting layer between the photographic element and the image receiving layer in case of not stripping off the both elements after processing. The light reflecting layer may be formed beforehand or formed at the time of processing by incorporating a light reflecting agent in the alkaline processing solution.

As the light reflecting agent, titanium dioxide, zinc oxide, barium sulfate, flaked silver, alumina, barium stearate or zirconium oxide can be used singly or in combination of more than two kinds of these compounds.

In case of forming the light reflecting layer beforehand, the light reflecting agent may be dispersed into any binder capable of forming an alkaline liquid-permeable layer, such as gelatin or polyvinylalcohol.

Such processes as disclosed in Japanese Laid-open-to-public Publication Nos. 486/71 and 477/72 may be used as a process for forming the light reflecting layer.

Into the aforesaid light reflecting layer, a whitening agent such as a stilbene or coumarin may be added. In case of developing the silver halide emulsion outside a camera after exposure, it is desirable to use an opacifying layer in order to shelter the silver halide emulsion from light. The opacifying layer may be formed beforehand as a layer or formed at the time of processing.

As the opacifying agent, carbon black or such indicator dyes as disclosed in Japanese Laid-open-to-Public Patent Publication Nos. 26/72, 27/72 and 28/72 can be used. Further, it is advantageous to use such desensitizers as disclosed in U.S. Pat. No. 3,579,333.

The aforesaid light reflecting layer and the opacifying layer may constitute the same layer or the mutually adjacent layers.

Various ways to arrange the layers in the film unit may be employed and there may be used in the invention such film units as disclosed in U.S. Pat. Nos. 3,415,644, 3,415,645, 3,415,646, 3,473,925, 3,573,042, 3,543,043, 3,594,164, 3,594,165, 3,615,421, 3,576,626, 3,658,524, 3,635,707, 3,672,890, 3,730,718, 3,701,656 and 3,689,262, Japanese Laid-open-to-public Patent Publication No. 6,337/75, and Belgian Pat. Nos. 757,959 and 757,960.

In the above-mentioned film units, such filter dye as suitable for improvement of desired photographic properties may be added to any position on an exposure side for the silver halide emulsion layer. As the filter dye, such dye as stable at usual pH but discolored due to the decomposition or the like in contact with the alkaline processing solution can be also used.

After a dye image is diffusion-transferred into the image receiving element, there remains in the photographic element the silver image and the image due to dye or dye precursor, both being reversally corresponding to the diffusion transfer image. If these remaining silver and silver halide are removed by processing with a bleaching solution and a fixing solution or with a bleaching-fixing solution and, if desired, further processing for converting the dye precursor into dye is carried out, there can be prepared the dye image reverse to that formed on the image receiving layer.

The present invention will be illustrated with reference to the following examples but the invention is not intended to be limited thereto. An experiment for demonstrating advantages of the invention was also conducted, which will be explained before the example.

<EXPERIMENT>

Element 1 was prepared by coating a below-mentioned solution on a transparent cellulose triacetate film having a gelatin-subbed layer thereon.

The solution was prepared by dissolving 0.15 g of compound (39) into 0.3 ml. of N,N-diethyllaurylamide and 0.6 ml. of ethyl acetate, adding, at 40° C., the resulting solution into 10 ml. of an aqueous 3% gelatin solution containing 1.0 ml. of an aqueous 3.5% Alkanol B (produced by Du Pont de Nemours Co.) solution, further adding into the resulting mixture 1.0 ml. of an aqueous 10% di-2-ethylhexylsuccinosulfonate solution and then dispersing the mixture thus prepared by means of a supersonic dispersing device for one minute.

Control elements A and B were respectively prepared in the exactly same manner except for using the control compounds of the following formulae [A] and [B] instead of compound (39).

Control Compound [A]:

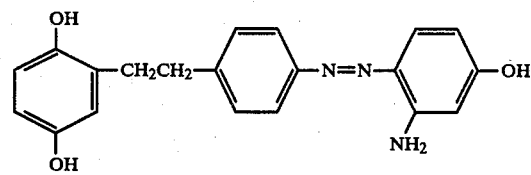

Control Compound [B]:

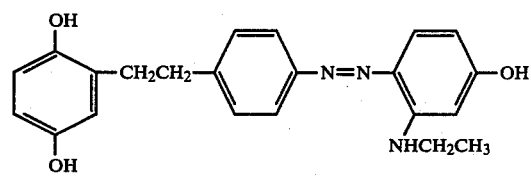

Each of the three elements were exposed to a Xenon Fademeter under such conditions as the temperature of 50° C. and the relative humidity of 60% respectively for 5, 24 and 48 hours. After exposure, a transmission density of each element was measured by means of Sakura Color Densitometer PD-6 Type (produced by Konishiroku Photo Industry Co.). The results were shown in Table 1 where the dye amount prior to exposure was rated as the standard 100.

Table 1

| Element | Exposure (hrs) | | | |
|---|---|---|---|---|
| | 0 | 5 | 24 | 48 |
| I | 100 | 100 | 98 | 96 |
| Control A | 100 | 93 | 90 | 82 |
| Control B | 100 | 95 | 92 | 86 |

As obvious from Table 1, it was proved that the monoazo type dye developer of compound (39) had more excellent light fastness than control compounds [A] and [B].

Instead of compound (39), compounds (7), (24), (28), (40), (41), (42), (44), (45), (49) and (63) were treated in the exactly same manner as mentioned above, so that each of compounds showed excellent light fastness.

EXAMPLE 1

Photographic element 1 was prepared by successively forming the following layers on a cellulose triacetate film having a gelatin-subbed layer thereon.

(1) Yellow dye developer layer

One part of compound (39) was dissolved in a solvent mixture comprising one part of N,N-diethyllaurylamide and three parts of ethyl acetate, and the resulting solution was emulsified by dispersing it into an aqueous gelatin solution containing Alkanol B as a surfactant. The emulsified dispersion was coated on the subbed film and dried so that the amounts of compound (39), N,N-diethyllaurylamide and gelatin were respectively 1.3 $g/m^2$, 1.3 $g/m^2$ and 2.5 $g/m^2$ in the resulting layer.

(2) Blue light-sensitive emulsion layer

A blue light-sensitive silver iodobromide emulsion was coated on the yellow dye developer layer so that the amounts of silver and gelatin were respectively 2.8 g/m² and 3.0 g/m².

(3) Protective layer

One part of p-tolylhydroquinone was dissolved in a solvent mixture comprising one part of dibutylphthalate and 1.7 parts of ethyl acetate and the resulting solution was emulsified by dispersing it into an aqueous gelatin solution. Then, the emulsified dispersion was added with mucochloric acid as a hardener. Then, the coating thereof was carried out so that the amounts of p-tolylhydroquinone, dibutylphthalate and gelatin were respectively 0.22 g/m², 0.22 g/m² and 0.5 g/m².

An image receiving element was prepared by successively forming the following layers on a baryta paper.

(1) Neutralizing layer

A layer having the dry thickness of 20μ was formed by coating a 5% acetone solution containing half butylester of a maleic anhydride-ethylene copolymer.

(2) Spacer layer

A layer having a dry thickness of 3μ was formed by coating an aqueous hydroxypropyl cellulose solution.

(3) Image receiving layer

One part of poly-4-vinylpyridine and two parts of polyvinylalcohol were dissolved in a mixture comprising a half part of glacial acetic acid and 150 parts of water, and the resulting solution was added with one twentieth part of 1-phenyl-5-mercaptotetrazole. Then, the coating thereof was carried out so that the amounts of poly-4-vinylpyridine, polyvinylalcohol and 1-phenyl-5-mercaptotetrazole were respectively 3.0 g/m², 6.0 g/m² and 0.15 g/m².

In addition to the above photographic element I using compound (39), the other photographic elements were also prepared in the same manner as shown in the photographic element I except of using the respective compounds (40), (41), (42), (44) and (45) instead of compound (39).

Each of these photographic elements was exposed through a light wedge to blue light from the side of the emulsion layer and then the exposed photographic element was superposed on the above-mentioned image receiving element so that the following alkaline processing solution was spread in the thickness of 20μ between the photographic element and the image receiving element.

The composition of the alkaline processing solution used was as follows:
Water: 100 ml
Potassium hydroxide: 11.2 g
Carboxymethylcellulose sodium salt: 3.5 g
Benzotriazole: 2.0 g
1-Phenethyl-2-picolinium bromide: 2.0 g After one minute, the photographic element was peeled off from the image receiving element and the maximum density ($D_{max}$) and the minimum density ($D_{min}$) of a yellow dye image prepared on the image receiving element were measured by means of a blue filter.

All of the photographic elements showed such preferable results as $D_{max}$ of 1.5–1.8 and $D_{min}$ of not more than 0.10.

EXAMPLE 2

A photographic element was prepared by successively forming the following layers on a opaque polyethyleneterephthalate base:

(1) Cyan dye developer layer 1.5-bis-(N-[p-(β-hydroquinonylethyl)phenyl]-N-trifluoroacetamido)-4,8-dihydroxyanthraquinone was dissolved in a solvent mixture of N,N-diethyllaurylamide and ethyl acetate, and the resulting solution was emulsified by dispersing it into an aqueous gelatin solution containing Alkanol B as a surfactant. The emulsified dispersion was coated so that the respective amounts of gelatin and the dye developer were 4.4 g/m² and 2.3 g/m².

(2) Red light-sensitive emulsion layer

A red light-sensitive silver iodobromide emulsion was coated so that the respective amounts of silver and gelatin were 2.4 g/m² and 2.4 g/m².

(3) Inter layer

An aqueous gelatin solution was coated so that its amount was 2.0 g/m².

(4) Magenta dye developer layer

2-[p-(β-hydroquinonylethyl)phenylazo]-4-n-propoxy-1-acetoxynaphthalene was dissolved into a solvent mixture of N,N-diethyllaurylamide and ethyl acetate, and the resulting solution was emulsified by dispersing it into an aqueous gelatin solution containing Alkanol B as a surfactant. The emulsified solution was coated so that the respective amounts of gelatin and the dye developer were 2.9 g/m² and 1.4 g/m².

(5) Green light-sensitive emulsion layer

A green light-sensitive silver iodobromide emulsion was coated so that the respective amounts of silver and gelatin were individually 1.2 g/m².

(6) Inter layer

An aqueous gelatin solution was coated so that its amount was 1.5 g/m².

(7) Yellow dye developer layer

Compound (39) was dissolved in a N-n-butylacetoanilide and cyclohexanone solvent mixture and the resulting solution was emulsified by dispersing it into an aqueous gelatin solution containing Alkanol B. The emulsified solution was coated so that the amounts of gelatin and the dye developer were respectively 1.1 g/m² and 0.5 g/m².

(8) Blue light-sensitive emulsion layer

A blue light-sensitive silver iodobromide emulsion was coated so that the respective amounts of silver and gelatin were 0.6 g/m² and 0.6 g/m².

(9) Protective layer p-Tolylhydroquinone was dissolved into N,N-diethyllaurylamide and the resulting solution was emulsified by dispersing it into an aqueous gelatin solution. The emulsified dispersion was coated so that the respective amounts of p-tolylhydroquinone and gelatin were 0.5 g/m² and 0.6 g/m².

The image receiving element was prepared in the same manner as in Example 1 except for using a transparent polyethylene terephthalate base instead of the baryta paper.

The processing solution here used was a mixture comprising the alkaline processing solution in Example 1 added further with 40 g of titanium dioxide.

The photographic element thus prepared was exposed through a wedge to blue, green and red lights from its emulsion layer side and the above-mentioned alkaline processing solution was spread between the photographic element and the image receiving element to carry out development. After several minutes, the positive transfer image corresponding to the exposed amounts of blue, green and red lights could be observed from the support side of the image receiving element.

What we claim is:

1. In a dye image forming process in color photography comprising imagewise exposing a photographic element comprising a support and a light sensitive silver halide emulsion layer, and processing the exposed photographic element with an alkaline processing solution in the presence of a dye developer whereby a dye image corresponding to the imagewise exposure is formed by oxidation of said developer as a function of development of silver halide, the improvement which comprises the dye developer being a mono azo dye developer represented by the following formula:

X—N=N—Y—NH—Z wherein X represents a monovalent group selected from an aromatic group, a non-aromatic-heterocyclic active-methylene-containing group, a non-aromatic-heterocyclic active-methyne-containing group, an aliphatic active-methylene-containing group, and an aliphatic active-methyne-containing group; and Y represents divalent and monovalent groups of an aromatic group; and Z represents phenyl at least one of the X, Y and Z has therein at least one of the developer groups which are either capable of developing silver halide or changeable to a group capable of developing silver halide, the azo radical (—N=N—) and the secondary amino radical (—NH—) are respectively attached to the adjacent carbon atoms in Y, the azo radical being attached to an aromatic ring of the aromatic group of X or to the active methylene or methyne of X and is attached to an aromatic ring of the aromatic group of Y, and the amino radical is attached to aromatic rings of Y and Z.

2. A dye image forming process according to claim 1 wherein Y in the formula is selected from a phenylene group and a naphthylene group.

3. A dye image forming process according to claim 1 wherein at least one of the X, Y and Z in the formula has at least one hydroxyl group.

4. A dye image forming process according to claim 3 wherein the at least one hydroxyl group is a tautomer of hydroxyl.

5. A dye image forming process according to claim 1 wherein the developer groups are p-dihydroxyphenyl and halogen- or alkyl-substituted p-dihydroxyphenyl.

6. A dye image forming process according to claim 3 wherein the at least one hydroxy group is in Y.

7. A dye image forming process according to claim 1 wherein the developer group is in X and/or Z.

8. A dye image forming process according to claim 5 wherein the developer group is in X.

9. A dye image forming process according to claim 8 wherein Y has at least one hydroxyl group.

10. A dye image forming process according to claim 9 wherein Y is selected from a phenylene group and a naphthylene group.

11. A dye image forming process according to claim 10 wherein X is a phenyl group.

12. A dye image forming process according to claim 1 wherein the image forming process further comprising superposing an image-receiving element on the photographic element before the processing whereby the image is formed on the image-receiving element by diffusion transfer.

13. A dye image forming process according to claim 12 wherein the photographic element comprises a light-sensitive silver halide emulsion layer and a layer adjacent thereto, the adjacent layer comprising the dye developer.

14. A dye image forming processing according to claim 13 wherein either the photographic element or the solution or both contain an auxiliary developer.

15. A dye image forming process according to claim 12 wherein the dye developer is selected from:

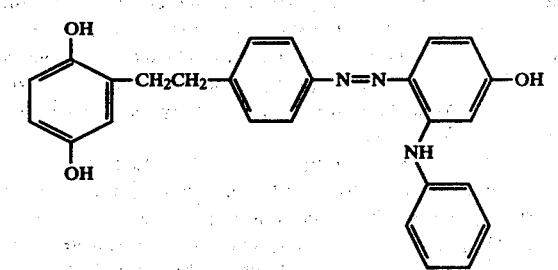

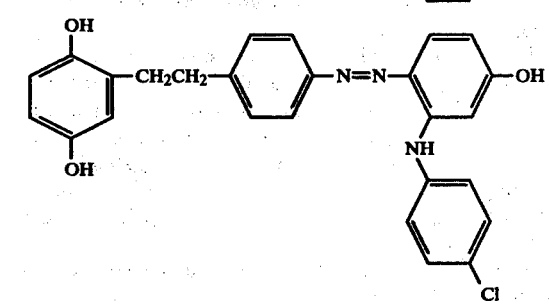

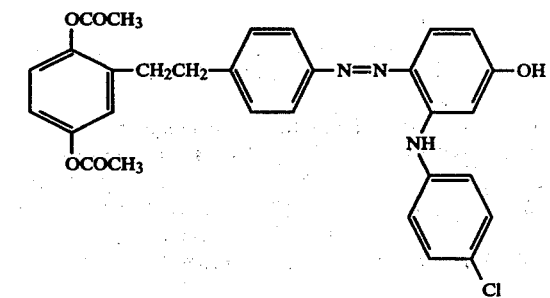

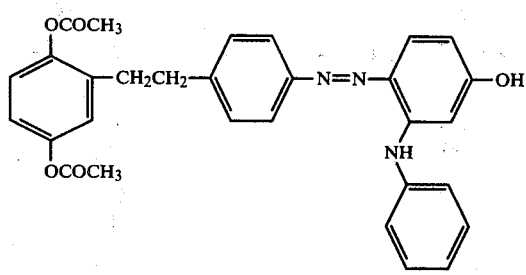
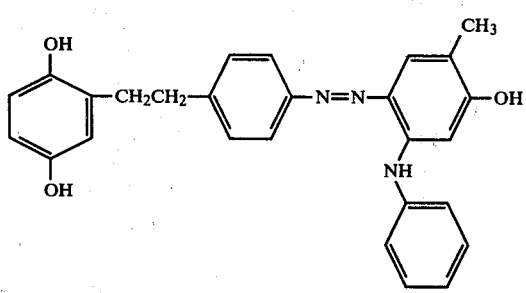
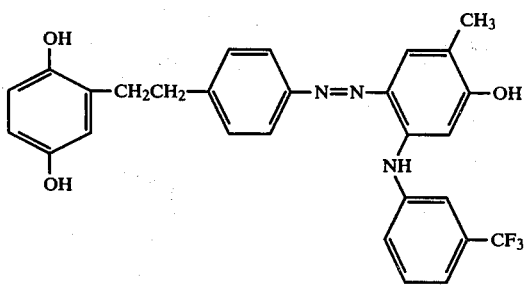
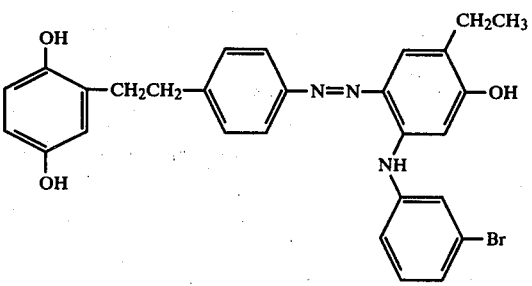
16. A dye image forming process according to claim 13 wherein the dye developer is selected from:
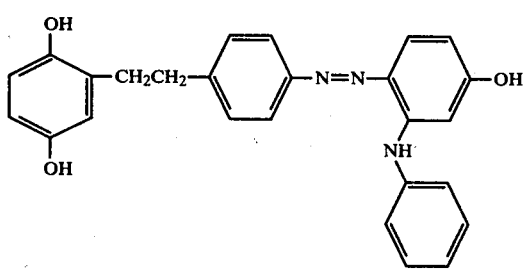
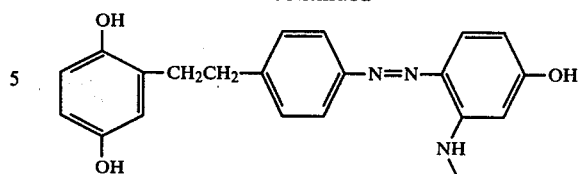
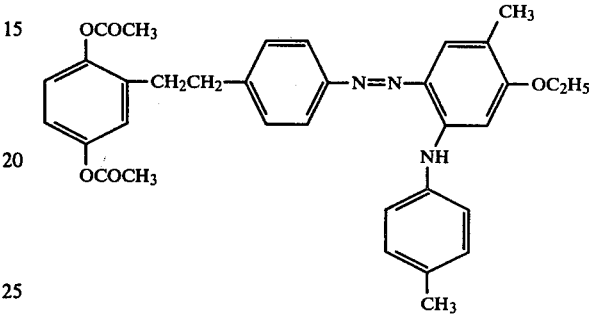
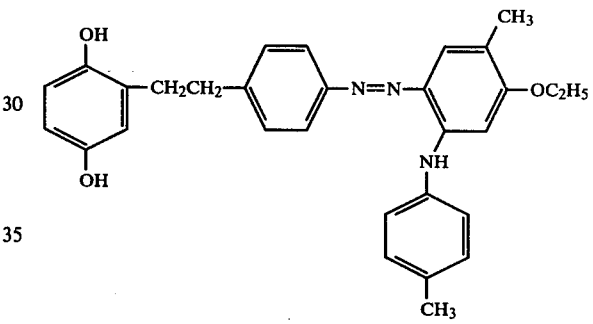
17. A dye image forming process according to claim 14 wherein the dye developer is selected from:
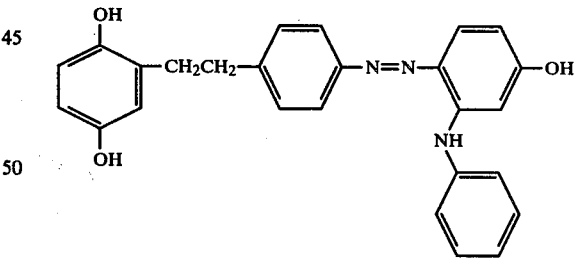
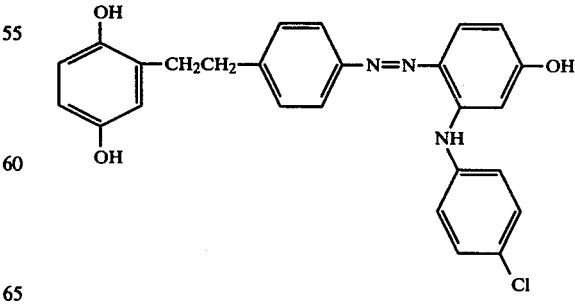
18. A dye image forming process according to claim 1 wherein the dye developer is selected from:

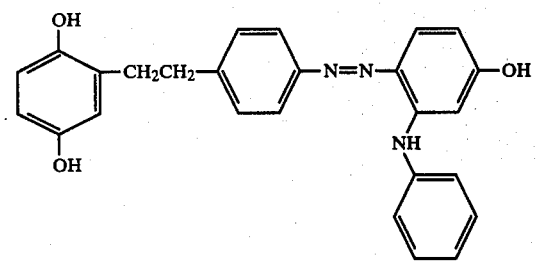
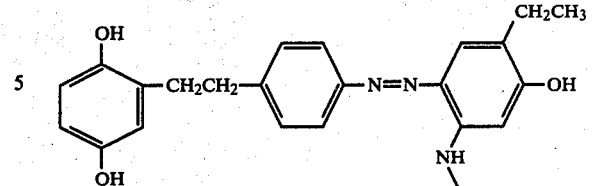
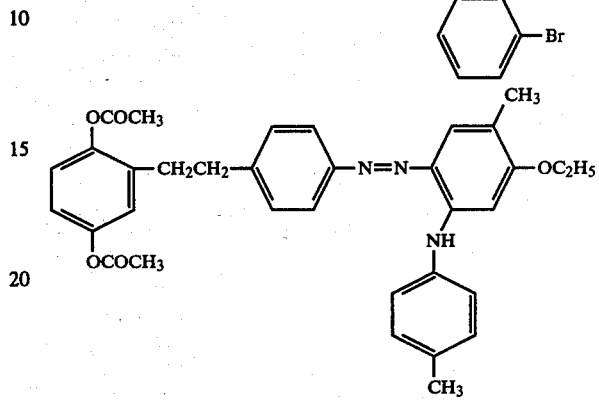
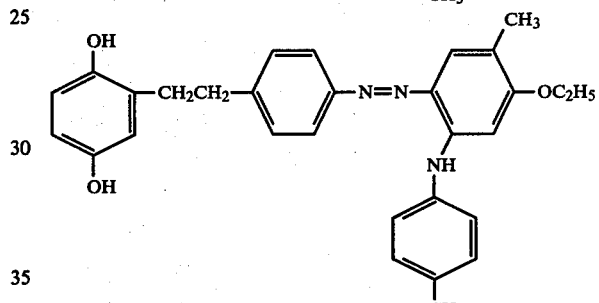
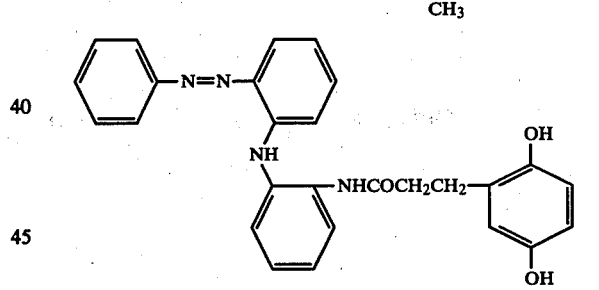
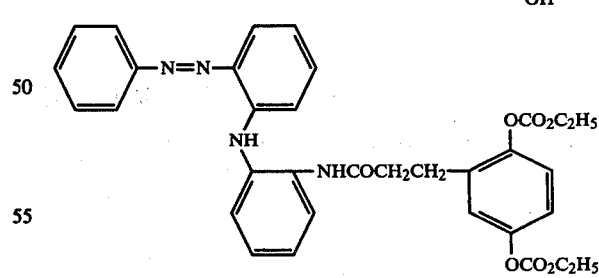
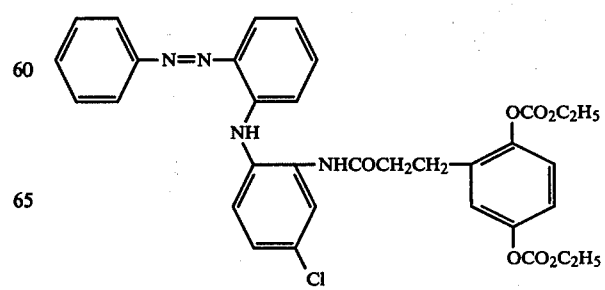

-continued

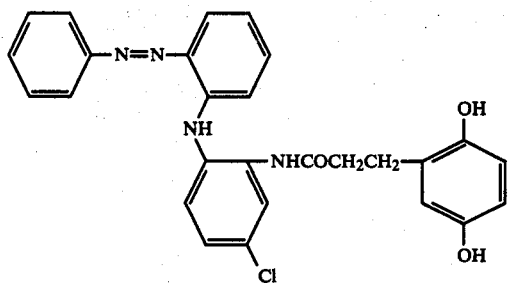

19. In a dye image forming process for color photography by use of a photographic combination comprising a transparent support, an image-receiving layer, a light reflecting layer, an opacifying layer, a layer comprising a monoazo dye developer, a light sensitive silver halide emulsion layer and a transparent cover sheet in that order, said process comprising imagewise exposing the combination to light from the cover sheet side and processing the exposed combination with an alkaline solution containing an opacifying agent, which solution is spread between the cover sheet and the emulsion layer, whereby a dye image is formed in the image-receiving element by diffusion transfer, the improvement which comprises the monoazo dye developer being represented by the formula:

$$X-N=N-Y-NH-Z$$

wherein X represents a monovalent group selected from an aromatic group, a non-aromatic-heterocyclic active-methylene-containing group, a non-aromatic-heterocyclic active-methyne-containing group, an aliphatic active-methylene-containing group, and an aliphatic active-methyne-containing group; Y represents divalent and monovalent groups of an aromatic group; and Z represents phenyl provided that at least one of the X, Y and Z has therein at least one of the developer groups which are either capable of developing silver halide or changeable to a group capable of developing silver halide, and further provided that the azo radical (—N=N—) and the secondary amino radical (—NH—) are respectively attached to the adjacent carbon atom in Y; the azo radical being attached to an aromatic ring of the aromatic group of X or to the active methylene or methyne of X and is attached to an aromatic ring of the aromatic group of Y, and the amino radical is attached to aromatic rings of Y and Z.

20. In a dye image forming process for color photography by use of a photographic combination comprising an opaque support, a layer containing a monoazo dye developer, a light-sensitive silver halide emulsion layer, an image-receiving layer and a transparent support in order, the opaque support being for the monoazo dye developer containing layer and the emulsion layer, the transparent support being for the image receiving layer which process comprises imagewise exposing the combination to light through the transparent support and processing the exposed combinations with an alkaline solution containing a light reflecting agent which solution is spread between the image-receiving layer and the emulsion layer whereby a dye image is formed in the image-receiving element by diffusion transfer, the improvement which comprises the monoazo dye developer being represented by the formula:

$$X-N=N-Y-NH-Z$$

wherein X represents a monovalent group selected from an aromatic group, a non-aromatic-heterocyclic active-methylene-containing group, a non-aromatic-heterocyclic active-methyne-containing group, an aliphatic active-methylene-containing group, and an aliphatic active-methyne-containing group; and Y represents divalent and monovalent groups of an aromatic group; and Z represents phenyl provided that at least one of the X, Y and Z has therein at least one of the developer groups which are either capable of developing silver halide or changeable to a group capable of developing silver halide, and further provided that the azo radical (—N=N—) and the secondary amino radical (—NH—) are respectively attached to the adjacent carbon atoms in Y; the azo radical being attached to an aromatic ring of the aromatic group of X or to the active methylene or methyne of X and is attached to an aromatic ring of the aromatic group of Y, and the amino radical is attached to aromatic rings of Y and Z.

* * * * *